US011362716B2

(12) United States Patent
Manolakos et al.

(10) Patent No.: US 11,362,716 B2
(45) Date of Patent: Jun. 14, 2022

(54) EXTRAPOLATED CSI REPORT BASED ON A MULTI-SYMBOL REFERENCE SIGNAL

(71) Applicant: QUALCOMM Incorporated, San Diego, CA (US)

(72) Inventors: Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 16/891,730

(22) Filed: Jun. 3, 2020

(65) Prior Publication Data

US 2021/0058125 A1    Feb. 25, 2021

(30) Foreign Application Priority Data

Aug. 23, 2019 (GR) .............................. 20190100369

(51) Int. Cl.
*H04B 7/06* (2006.01)
*H04B 7/0456* (2017.01)
(Continued)

(52) U.S. Cl.
CPC ......... *H04B 7/0626* (2013.01); *H04B 7/0456* (2013.01); *H04B 7/0632* (2013.01);
(Continued)

(58) Field of Classification Search
CPC .. H04B 7/0626; H04B 7/0456; H04B 7/0632; H04L 5/005; H04L 5/001; H04L 5/1469;
(Continued)

(56) References Cited

U.S. PATENT DOCUMENTS

2015/0023194 A1* 1/2015 Seo ...................... H04L 1/0027
                                                        370/252
2017/0201308 A1* 7/2017 Park ...................... H04B 7/0417
(Continued)

FOREIGN PATENT DOCUMENTS

WO    WO-2018204467 A1    11/2018

OTHER PUBLICATIONS

International Search Report and Written Opinion—PCT/US2020/045154—ISAEPO—dated Nov. 9, 2020.

*Primary Examiner* — Shailendra Kumar
(74) *Attorney, Agent, or Firm* — QUALCOMM Incorporated

(57) ABSTRACT

Methods, systems, and devices for wireless communications are described. In some systems (e.g., non-beam related channel state information (CSI) reporting), a CSI processing unit (CPU) may process CSI calculations for a CSI report. A user equipment may have a set number of CPUs. In some cases, there may not be enough CPUs available to process a CSI report for each CSI-RS due the CPU capability of the UE. In such cases, the UE may select a subset of the CSI-RSs to generate an extrapolated CSI report. To extrapolate, the UE may measure channel conditions of at least some pre-configured number (e.g., at least two) of CSI-RSs and determine the channel condition of a point later in time and report this extrapolation in a CSI report to the base station. A base station may schedule future data transmissions with the user equipment based on the extrapolated CSI report.

30 Claims, 16 Drawing Sheets

(51) Int. Cl.
   *H04L 5/00*      (2006.01)
   *H04W 8/24*      (2009.01)
   *H04W 72/04*     (2009.01)
   *H04W 76/27*     (2018.01)
   *H04W 80/02*     (2009.01)
(52) U.S. Cl.
   CPC .............. *H04L 5/005* (2013.01); *H04W 8/24* (2013.01); *H04W 72/042* (2013.01); *H04W 76/27* (2018.02); *H04W 80/02* (2013.01)
(58) Field of Classification Search
   CPC ... H04L 5/0023; H04L 5/0082; H04L 5/0091; H04L 5/0057; H04L 5/0048; H04W 8/24; H04W 72/042; H04W 76/27; H04W 80/02; H04W 72/085
   See application file for complete search history.

(56) References Cited

U.S. PATENT DOCUMENTS

| | | | | |
|---|---|---|---|---|
| 2017/0237478 A1* | 8/2017 | Kwak | ................... | H04L 5/0094 |
| | | | | 370/329 |
| 2019/0159219 A1 | 5/2019 | Hosseini et al. | | |
| 2021/0242988 A1* | 8/2021 | Kwak | ................... | H04L 5/0048 |
| 2021/0351825 A1* | 11/2021 | Zhang | ................. | H04B 17/309 |

* cited by examiner

EXTRAPOLATED CSI REPORT BASED ON A MULTI-SYMBOL REFERENCE SIGNAL

CROSS REFERENCE

The present Application for Patent claims the benefit of Greece Provisional Patent Application No. 20190100369 by MANOLAKOS et al., entitled "EXTRAPOLATED CSI REPORT BASED ON A MULTI-SYMBOL REFERENCE SIGNAL," filed Aug. 23, 2019, assigned to the assignee hereof, and expressly incorporated by reference herein.

FIELD OF TECHNOLOGY

The following relates generally to wireless communications and more specifically to an extrapolated channel state information (CSI) report based on a multi-symbol reference signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

CSI resources (e.g., CSI-RS) may be measured by a UE to estimate channel quality between a base station and UE, where the channel quality may be indicated by measured parameters (e.g., channel quality indicator (CQI), precoding matrix indicator (PMI), rank indicator (RI), layer one reference signal received power (L1-RSRP)). The UE may transmit a CSI report to the base station indicating the channel quality information that the base station may use for data transmissions. The base station may want to use this report for scheduling in the future. Conventional CSI reporting techniques are deficient.

SUMMARY

The described techniques relate to improved methods, systems, devices, and apparatuses that support extrapolated CSI reports based on a multi-symbol reference signal. Generally, the described techniques provide for mitigating reporting of outdated CSI by utilizing remaining, available CSI processing units (CPUs) when generating a CSI report. In some scenarios, a UE may be capable of simultaneously performing a defined number of CSI calculations. The number of CPUs may be equal to the number of CSI calculations that the UE is capable of simultaneously processing. In some examples, the UE may be configured to generate multiple reports to which some of the CPUs may already be allocated for one or more ongoing CSI calculations. In cases where there are not enough CPUs available for the UE to simultaneously perform CSI calculations on each CSI reference signal (CSI-RS) the UE is configured to report, the UE may select a subset of the CSI-RSs corresponding to a number of available CPUs, and may use the available CPUs to perform CSI calculations for generating the CSI report. Beneficially, the UE may generate the CSI using the available CPUs and thereby may provide a base station with non-stale CSI for scheduling communication with the UE.

A method of wireless communications by a UE is described. The method may include transmitting a processing unit budget message that indicates a number of processing units that the UE is capable of simultaneously supporting, receiving control signaling that configures the UE to transmit a first channel status report (e.g., channel state report) corresponding to at least one first reference signal symbol associated with a first processing unit utilization, receiving control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, transmitting the first channel status report that is generated by a first processing unit of the number of processing units, and transmitting the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

An apparatus for wireless communications by a UE is described. The apparatus may include a processor, memory coupled with the processor, and instructions stored in the memory. The instructions may be executable by the processor to cause the apparatus to transmit a processing unit budget message that indicates a number of processing units that the UE is capable of simultaneously supporting, receive control signaling that configures the UE to transmit a first channel status report corresponding to at least one first reference signal symbol associated with a first processing unit utilization, receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, transmit the first channel status report that is generated by a first processing unit of the number of processing units, and transmit the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

Another apparatus for wireless communications by a UE is described. The apparatus may include means for transmitting a processing unit budget message that indicates a number of processing units that the UE is capable of simultaneously supporting, receiving control signaling that configures the UE to transmit a first channel status report corresponding to at least one first reference signal symbol associated with a first processing unit utilization, receiving control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, transmitting the first channel status report that is generated by a first processing unit of the number of processing units, and transmitting the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

A non-transitory computer-readable medium storing code for wireless communications by a UE is described. The code may include instructions executable by a processor to transmit a processing unit budget message that indicates a number of processing units that the UE is capable of simultaneously supporting, receive control signaling that configures the UE to transmit a first channel status report corresponding to at least one first reference signal symbol associated with a first processing unit utilization, receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, transmit the first channel status report that is generated by a first processing unit of the number of processing units, and transmit the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

In some examples of the method, apparatuses, and non-transitory computer-readable medium described herein, receiving the control signaling that configures the UE to transmit the second channel status report may include operations, features, means, or instructions for receiving the control signaling that configures the UE to transmit the second channel status report as a CSI report associated with a channel state for a time interval that occurs after the second channel status report may have been transmitted.

In some examples of the method, apparatuses, and non-transitory computer-readable medium described herein, the CSI report associated with the channel state for the time interval that occurs after the second channel status report may have been transmitted includes non-beam related information including a RI, or a PMI, or a CQI, or any combination thereof.

In some examples of the method, apparatuses, and non-transitory computer-readable medium described herein, receiving the control signaling that configures the UE to transmit the second channel status report may include operations, features, means, or instructions for receiving the control signaling that configures the UE to transmit the second channel status report using at least two of the set of second reference signal symbols that may be separated by a time duration that satisfies a threshold.

In some examples of the method, apparatuses, and non-transitory computer-readable medium described herein, receiving the control signaling that configures the UE to transmit the first channel status report may include operations, features, means, or instructions for receiving a reporting configuration that indicates a reference resource, where the at least one first reference signal symbol may be identified in time relative to the reference resource.

In some examples of the method, apparatuses, and non-transitory computer-readable medium described herein, receiving the control signaling that configures the UE to transmit the second channel status report may include operations, features, means, or instructions for receiving a reporting configuration that indicates the set of second reference signal symbols.

In some examples of the method, apparatuses, and non-transitory computer-readable medium described herein, receiving the control signaling that configures the UE to transmit the second channel status report may include operations, features, means, or instructions for receiving the control signaling that configures the UE with a parameter configuration for generating the second channel status.

Some examples of the method, apparatuses, and non-transitory computer-readable medium described herein may further include operations, features, means, or instructions for adjusting the parameter configuration based on the sum of the first processing unit utilization and the second processing unit utilization exceeding the number of processing units that the UE may be capable of simultaneously supporting during the period of time, where the second channel status report may be generated based on the adjusted parameter configuration.

Some examples of the method, apparatuses, and non-transitory computer-readable medium described herein may further include operations, features, means, or instructions for identifying an overflow condition based on the sum of the first processing unit utilization and the second processing unit utilization exceeding the number of processing units that the UE may be capable of simultaneously supporting during the period of time, and identifying the subset of the processing units, or a subset of the set of second reference signal symbols to process, or both, based on the overflow condition.

Some examples of the method, apparatuses, and non-transitory computer-readable medium described herein may further include operations, features, means, or instructions for identifying a defined number of processing units to be utilized for generating the second channel status report that may be a channel status report indicating a channel state of a time interval that occurs after the second channel status report may have been transmitted, where the overflow condition may be identified based on the defined number of processing units.

Some examples of the method, apparatuses, and non-transitory computer-readable medium described herein may further include operations, features, means, or instructions for adjusting a parameter configuration based on identifying the overflow condition, where the second channel status report may be generated based on the adjusted parameter configuration.

In some examples of the method, apparatuses, and non-transitory computer-readable medium described herein, receiving the control signaling that configures the UE to transmit a second channel status report may include operations, features, means, or instructions for receiving the control signaling that indicates a defined number of reference signal resources to use for deriving the second channel status report for a future time interval and a threshold number of the defined number of reference signal resources to utilize when an overflow condition may be identified, where the second report may be generated using at least the threshold number of the reference signal resources.

Some examples of the method, apparatuses, and non-transitory computer-readable medium described herein may further include operations, features, means, or instructions for generating the second channel status report associated with at least one channel status parameter for a time interval that occurs after the second channel status report may have been transmitted.

Some examples of the method, apparatuses, and non-transitory computer-readable medium described herein may further include operations, features, means, or instructions for generating the second channel status report to satisfy a performance criterion associated with the subset of the number of processing units, or the number of reference signal symbols, or a combination thereof.

In some examples of the method, apparatuses, and non-transitory computer-readable medium described herein, the second channel status report occupies up to all remaining available processing units of the number of processing units that may be not utilized for generation of the first channel status report.

In some examples of the method, apparatuses, and non-transitory computer-readable medium described herein, the second channel status report may be a channel status information report (e.g., CSI report) that indicates a wideband RI, or a narrowband RI, or a wideband PMI, or a narrowband PMI, or a wideband CQI, or a narrowband CQI, or any combination thereof.

In some examples of the method, apparatuses, and non-transitory computer-readable medium described herein, the first channel status report may be a periodic CSI report, or a semi-persistent CSI report, or an aperiodic CSI report, and the second channel status report may be an aperiodic CSI report.

In some examples of the method, apparatuses, and non-transitory computer-readable medium described herein, the first channel status report may be a periodic CSI report, or a semi-persistent CSI report, or an aperiodic CSI report that has a same time behavior as the second channel status report that may be a periodic CSI report, or a semi-persistent CSI report, or an aperiodic CSI report.

In some examples of the method, apparatuses, and non-transitory computer-readable medium described herein, the second status report does not include a reference signal receive power (RSRP) report, a layer one signal to interference plus noise report (L1-SINR), or a combination thereof.

Some examples of the method, apparatuses, and non-transitory computer-readable medium described herein may further include operations, features, means, or instructions for transmitting a capability message that indicates that the UE supports reporting an adjusted channel status report associated with a channel state for a time interval that occurs after the second channel status report may have been transmitted generated by the subset of the processing units that may be smaller than a defined number of processing units for the second processing unit utilization.

Some examples of the method, apparatuses, and non-transitory computer-readable medium described herein may further include operations, features, means, or instructions for identifying an overflow condition based at least part on identifying that a set of channel status reports may be configured, the set of channel status reports including the second channel status report, and adjusting allocation of the number of processing units for generation of a respective channel status report of the set of channel status reports based on the overflow condition.

In some examples of the method, apparatuses, and non-transitory computer-readable medium described herein, adjusting the allocation may include operations, features, means, or instructions for subtracting a first number of processing units from the allocation for each of the respective channel status reports of a first subset of the set of channel status reports, and a second number of processing units from the allocation for a second subset of the set of channel status reports.

In some examples of the method, apparatuses, and non-transitory computer-readable medium described herein, adjusting the allocation may include operations, features, means, or instructions for subtracting all allocated processing units to generation of a first channel status report of the set of channel status reports, where the first channel status report may be selected based on an index or a priority rule, and reporting a stale channel status report as the first channel status report.

In some examples of the method, apparatuses, and non-transitory computer-readable medium described herein, adjusting the allocation may include operations, features, means, or instructions for de-allocating all processing units allocated to generation of a first channel status report of the set of channel status reports, where the first channel status report may be selected based on an index or a priority rule.

In some examples of the method, apparatuses, and non-transitory computer-readable medium described herein, the control signaling includes DCI, a medium access control (MAC) control element (CE), a Radio Resource Control (RRC) message, or a combination thereof.

Some examples of the method, apparatuses, and non-transitory computer-readable medium described herein may further include operations, features, means, or instructions for receiving the control signaling that configures the UE to transmit a second channel status report may be based on the processing unit budget message.

A method of wireless communications by a base station is described. The method may include receiving a processing unit budget message that indicates a number of processing units that a UE is capable of simultaneously supporting, transmitting control signaling that configures the UE to transmit a first channel status report corresponding to at least one first reference signal symbol associated with a first processing unit utilization, transmitting control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, receiving the first channel status report that is generated by a first processing unit of the number of processing units, and receiving the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

An apparatus for wireless communications by a base station is described. The apparatus may include a processor, memory coupled with the processor, and instructions stored in the memory. The instructions may be executable by the processor to cause the apparatus to receive a processing unit budget message that indicates a number of processing units that a UE is capable of simultaneously supporting, transmit control signaling that configures the UE to transmit a first channel status report corresponding to at least one first reference signal symbol associated with a first processing unit utilization, transmit control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, receive the first channel status report that is generated by a first processing unit of the number of processing units, and receive the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

Another apparatus for wireless communications by a base station is described. The apparatus may include means for receiving a processing unit budget message that indicates a number of processing units that a UE is capable of simultaneously supporting, transmitting control signaling that configures the UE to transmit a first channel status report corresponding to at least one first reference signal symbol associated with a first processing unit utilization, transmitting control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, receiving the first channel status report that is generated by a first processing unit of the number of processing units, and receiving the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

A non-transitory computer-readable medium storing code for wireless communications by a base station is described. The code may include instructions executable by a processor to receive a processing unit budget message that indicates a number of processing units that a UE is capable of simultaneously supporting, transmit control signaling that configures the UE to transmit a first channel status report corresponding to at least one first reference signal symbol associated with a first processing unit utilization, transmit control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, receive the first channel status report that is generated by a first processing unit of the number of processing units, and receive the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units.

In some examples of the method, apparatuses, and non-transitory computer-readable medium described herein, transmitting the control signaling that configures the UE to transmit the second channel status report may include operations, features, means, or instructions for transmitting the control signaling that configures the UE to transmit the second channel status report as a CSI report associated with a channel state for a time interval that occurs after the second channel status report may have been transmitted.

In some examples of the method, apparatuses, and non-transitory computer-readable medium described herein, transmitting the control signaling that configures the UE to transmit the second channel status report may include operations, features, means, or instructions for transmitting the control signaling that configures the UE to transmit the second channel status report using at least two of the set of second reference signal symbols that may be separated by a time duration that satisfies a threshold.

In some examples of the method, apparatuses, and non-transitory computer-readable medium described herein, transmitting the control signaling that configures the UE to transmit the first channel status report may include operations, features, means, or instructions for transmitting a reporting configuration that indicates a reference resource, where the at least one first reference signal symbol may be identified in time relative to the reference resource.

In some examples of the method, apparatuses, and non-transitory computer-readable medium described herein, transmitting the control signaling that configures the UE to transmit the second channel status report may include operations, features, means, or instructions for transmitting a reporting configuration that indicates the set of second reference signal symbols.

In some examples of the method, apparatuses, and non-transitory computer-readable medium described herein, transmitting the control signaling that configures the UE to transmit the second channel status report may include operations, features, means, or instructions for transmitting the control signaling that configures the UE with a parameter configuration for generating the second channel status.

Some examples of the method, apparatuses, and non-transitory computer-readable medium described herein may further include operations, features, means, or instructions for adjusting the parameter configuration based on the sum of the first processing unit utilization and the second processing unit utilization exceeding the number of processing units that the UE may be capable of simultaneously supporting during the period of time, where the second channel status report may be generated based on the adjusted parameter configuration.

Some examples of the method, apparatuses, and non-transitory computer-readable medium described herein may further include operations, features, means, or instructions for identifying an overflow condition based on the sum of the first processing unit utilization and the second processing unit utilization exceeding the number of processing units that the UE may be capable of simultaneously supporting during the period of time, and identifying the subset of the processing units, or a subset of the set of second reference signal symbols to process, or both, based on the overflow condition.

Some examples of the method, apparatuses, and non-transitory computer-readable medium described herein may further include operations, features, means, or instructions for identifying a defined number of processing units to be utilized for generating the second channel status report that may be a channel status report indicating a channel state of a time interval that occurs after the second channel status report may have been transmitted, where the overflow condition may be identified based on the defined number of processing units.

Some examples of the method, apparatuses, and non-transitory computer-readable medium described herein may further include operations, features, means, or instructions for adjusting a parameter configuration based on identifying the overflow condition, where the second channel status report may be generated based on the adjusted parameter configuration.

In some examples of the method, apparatuses, and non-transitory computer-readable medium described herein, transmitting the control signaling that configures the UE to transmit a second channel status report may include operations, features, means, or instructions for transmitting the control signaling that indicates a defined number of reference signal resources to use for deriving the second channel status report for a future time interval and a threshold number of the defined number of reference signal resources to utilize when an overflow condition may be identified, where the second report may be generated using at least the threshold number of the reference signal resources.

In some examples of the method, apparatuses, and non-transitory computer-readable medium described herein, the second channel status report occupies up to all remaining available processing units of the number of processing units that may be not utilized for the generation of the first channel status report.

In some examples of the method, apparatuses, and non-transitory computer-readable medium described herein, the second channel status report may be a CSI report that indicates a wideband RI, or a narrowband RI, or a wideband PMI, or a narrowband PMI, or a wideband CQI, or a narrowband channel quality indicator, or any combination thereof.

In some examples of the method, apparatuses, and non-transitory computer-readable medium described herein, the first channel status report may be a periodic CSI report, or a semi-persistent CSI report, or an aperiodic CSI report, and the second channel status report may be an aperiodic CSI report.

In some examples of the method, apparatuses, and non-transitory computer-readable medium described herein, the first channel status report may be a periodic CSI report, or a semi-persistent CSI report, or an aperiodic CSI report that has a same time behavior as the second channel status report that may be a periodic CSI report, or a semi-persistent CSI report, or an aperiodic CSI report.

In some examples of the method, apparatuses, and non-transitory computer-readable medium described herein, the second status report does not include a reference signal receive power (RSRP) report, a layer one signal to interference plus noise report (L1-SINR), or a combination thereof.

Some examples of the method, apparatuses, and non-transitory computer-readable medium described herein may further include operations, features, means, or instructions for receiving a capability message that indicates that the UE supports reporting an adjusted channel status report associated with a channel state for a time interval that occurs after the second channel status report may have been transmitted generated by the subset of the processing units that may be smaller than a defined number of processing units for the second processing unit utilization.

In some examples of the method, apparatuses, and non-transitory computer-readable medium described herein, the control signaling includes DCI, a MAC CE, an RRC message, or a combination thereof.

Some examples of the method, apparatuses, and non-transitory computer-readable medium described herein may further include operations, features, means, or instructions for transmitting the control signaling that configures the UE to transmit a second channel status report may be based on the processing unit budget message.

DETAILED DESCRIPTION

A UE may use CSI-RSs to estimate channel quality between a base station and UE, and the UE may transmit a CSI report to the base station indicating the channel quality information. In some systems (e.g., NR wireless communication system), there may be a CPU, where the number of CPUs may be equal to the number of simultaneous CSI calculations supported by the UE. The CPU may be a calculation engine that may perform CSI calculations that are reported in the CSI report (e.g., aperiodic, periodic, extrapolated).

When generating a CSI report, the UE may allocate one or more available CPUs to perform one or more CSI calculations for the CSI report. In some cases, there may not be enough CPUs available because the UE has already allocated some of the CPUs for performing ongoing CSI calculations for generating one or more other CSI reports. In conventional techniques, the UE may skip performing the CSI calculations and may instead transmit a stale CSI report (e.g., a previously calculated CSI report stored in memory), or the UE may pad the CSI report with dummy bits. In such cases, the base station may report outdated CSI information potentially resulting in decreased data throughput.

To mitigate the use of outdated information in CSI reporting, partial CPU counting for an extrapolated CSI report may be employed. In cases where the UE may not have the capability to transmit a CSI report for each CSI-RS the UE is configured to report, the UE may select a subset of the CSI-RSs to generate an extrapolated CSI report such that a report contains up-to-date CSI information using the remaining, available CPUs. The CSI report configured based on a subset of CSI-RS resources may be less precise than a CSI report configured based on a full set of CSI-RSs, but may be more precise than transmitting a stale report.

Particular aspects of the subject matter described herein may be implemented to realize one or more advantages. The described techniques may support improvements in CSI processing, decrease processing time, and improve data throughput, among other advantages. As such, supported techniques may include improved network operations and, in some examples, may promote network efficiencies, among other benefits.

Aspects of the disclosure are initially described in the context of wireless communications systems. Further examples are then provided that illustrate CSI processing techniques to mitigate transmitting stale CSI reports. Aspects of the disclosure are further illustrated by and described with reference to apparatus diagrams, system diagrams, and flowcharts that relate to extrapolated CSI report based on a multi-symbol RS.

Figure 1:
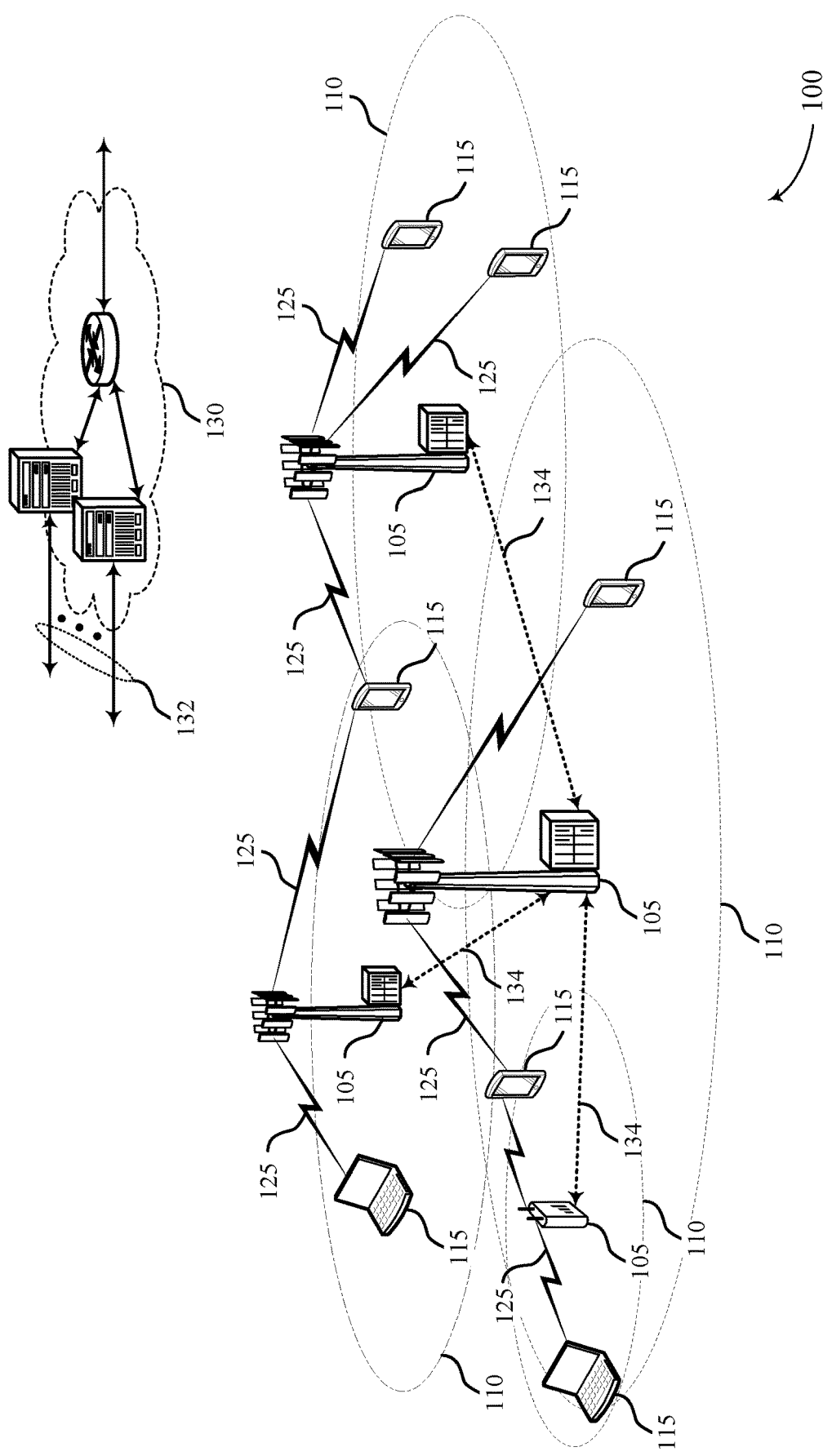
FIG. 1 illustrates an example of a system for wireless communications that supports an extrapolated CSI report based on a multi-symbol reference signal in accordance with aspects of the present disclosure.

FIG. 1 illustrates an example of a wireless communications system 100 that supports an extrapolated CSI report based on a multi-symbol reference signal in accordance with aspects of the present disclosure. The wireless communications system 100 may include base stations 105, UEs 115, and a core network 130. In some examples, the wireless communications system 100 may be an LTE network, an LTE-Advanced (LTE-A) network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, or network equipment (e.g., core network nodes, relay devices, integrated access and backhaul (IAB) nodes, or other network equipment), or a combination thereof as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths or a combination thereof. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may measure CSI-RS resources to estimate channel quality of a CSI reference resource slot that may be indicated by measured channel quality parameters (e.g., CQI, PMI, RI, L1-RSRP, I1). The UE 115 may transmit a CSI report to the base station 105 indicating the measured channel quality parameters for the CSI reference resource slot. The base station 105 may use the CSI report for scheduling in the future. Additionally or alternatively, there may be gaps (e.g., intervals of 4 ms) between transmission of a CSI-RS and CSI report, and between transmission of the CSI report and data transmissions scheduled based on the CSI report. In such cases, CSI aging my result, and data transmission scheduled based on the outdated CSI report may not be successful. In some cases, the CSI report may be outdated due to processing time and channel aging. For example, a CSI-RS may be transmitted in slot n1, the corresponding CSI report is transmitted subsequently one or more slots later in slot n2, but the actual data transmission is communicated one or more slots later in slot n3. Thus, in some cases, the data transmission is based on an outdated CSI.

To mitigate the use of outdated information in CSI reporting, the capability of the UE 115 may be considered to efficiently utilize remaining resources of the UE 115 to process CSI reports. A UE 115 may be configured with multiple CSI-RS resources, such that the UE 115 may use the multiple CSI-RS resources to extrapolate CSI in the time domain for a future slot and report the extrapolated CSI in an extrapolated CSI report. In such cases where the UE 115 may not have sufficient CPUs to simultaneously perform CSI calculations on each CSI-RS the UE 115 is configured to report, the UE 115 may use a subset of its CPUs to monitor a subset of the CSI-RS resources to generate an extrapolated CSI report. This extrapolation using a subset of CSI-RSs may enable the UE 115 to provide more up to date CSI information in the extrapolated CSI report, as compared to transmitting a stale or outdated CSI report that may result in decreased data throughout.

Figure 2:
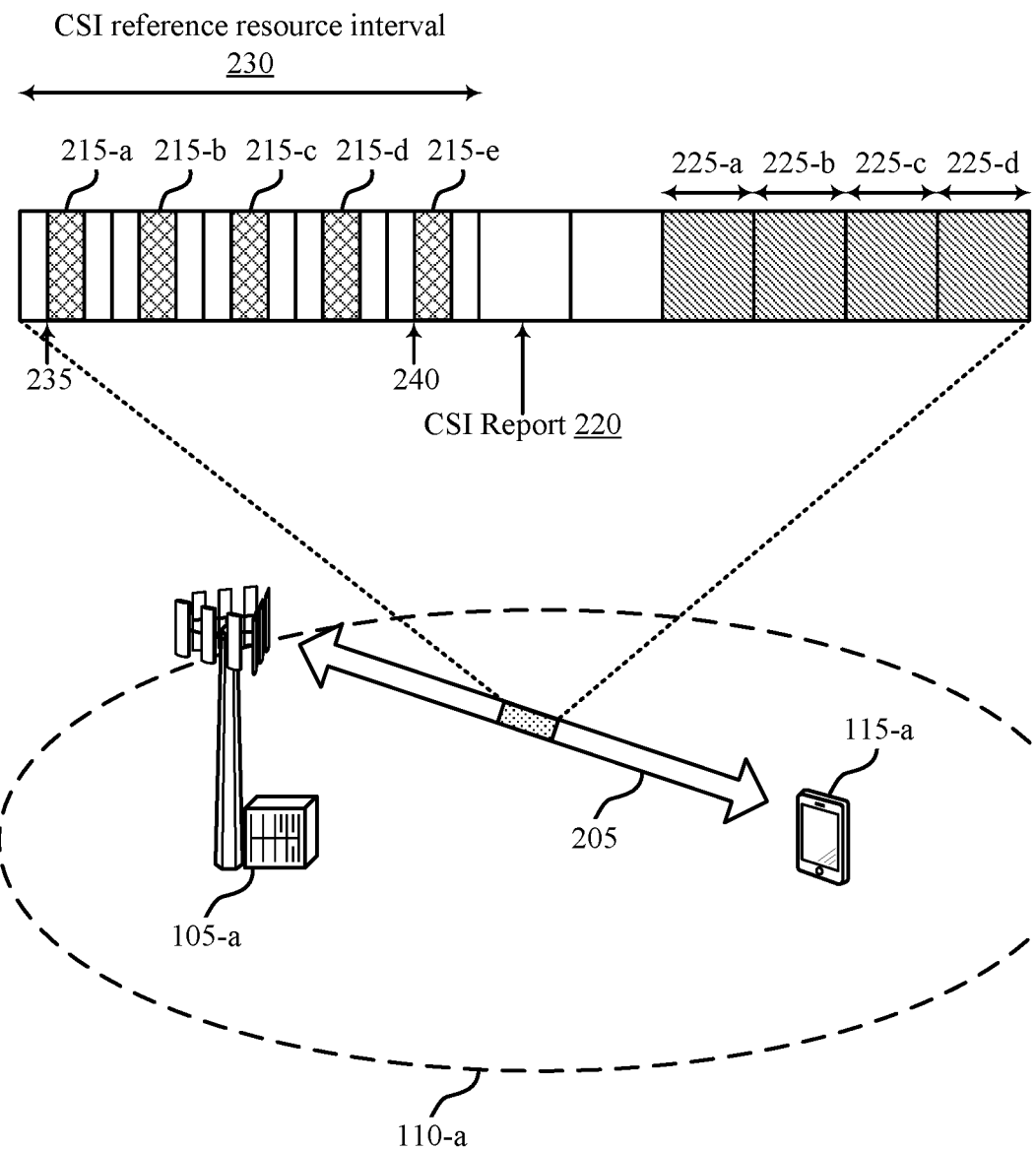
FIG. 2 illustrates an example of a system for wireless communications that supports an extrapolated CSI report based on a multi-symbol reference signal in accordance with aspects of the present disclosure.

FIG. 2 illustrates an example of a system for wireless communications 200 that supports an extrapolated CSI report based on a multi-symbol reference signal in accordance with aspects of the present disclosure. The wireless communications system 200 may include base station 105-*a* and UE 115-*a*, which may be examples of base stations 105 and UEs 115 as described with reference to FIG. 1. Base station 105-*a* may serve a geographic coverage area 110-*a*. In some cases, UE 115-*a* may implement CSI processing criteria for CPU counting and extrapolated CSI reference reports. For example, UE 115-*a* may implement the CSI processing criteria to transmit to base station 105-*a* a CSI report that indicates extrapolated CSI corresponding to future time intervals (e.g., future slots) in which data transmissions are scheduled by base station 105-*a*. Additionally or alternatively, other wireless devices, such as base station 105-*a*, may implement CSI processing criteria for improved efficiency and data throughput for system communications.

A base station 105 may transmit a CSI-RS within one or more CSI resources for measurement by a UE 115 to estimate channel quality between the base station 105 and the UE 115. The UE 115 may transmit a CSI report to the base station 105 indicating the channel quality information that the base station 105 may use for scheduling subsequent data transmissions. In some cases, there may be gaps (e.g., intervals that may be 4 ms) between transmission of a CSI-RS and a CSI report, and between transmission of the CSI report and data transmissions scheduled using the CSI report. In such cases, CSI aging may result and the data transmission, scheduled based on the outdated CSI report, may not be successful. The CSI report may be outdated due to processing time and channel aging. For example, at least one CSI-RS 215 may be transmitted some time prior to the corresponding CSI report 220, and the CSI report 220 may be transmitted some time prior to a data transmission, where there may be gaps in time between the CSI-RS, CSI report, and data transmissions. In such examples, channel conditions may change in the time from the CSI-RS measurement and data transmission and the data transmission may be based on the outdated CSI-RS.

UE capability regarding configured CPUs may also impact CSI reporting. A CPU may be equal to the number of simultaneous CSI calculations the UE 115 is capable of supporting at the same time. The UE 115 may be capable of a fixed amount of CSI calculations. In some cases, the UE 115 may be configured to monitor more CSI-RS resources, and simultaneously perform CSI calculations than the UE 115 is capable of calculating. In conventional solutions, the UE 115 may transmit a previously calculated CSI report that was stored in memory (e.g., a stale CSI report) in place of the CSI-RS reports the UE 115 does not have a sufficient number of CPUs available to perform the simultaneous CSI calculations. Transmitting the stale CSI report may result in the base station 105 scheduling a data transmission that is based on outdated CSI information.

To mitigate the use of outdated information in CSI reporting, partial CPU counting for an extrapolated CSI report may be employed. A UE 115 may be configured with a CSI reference resource interval 230 that may include multiple CSI-RS 215 symbols (e.g., multiple CSI-RS resources in one set, or multiple sets each including at least one CSI-RS resource, or one CRI-RS resource with multiple symbols), such that the UE 115 may extrapolate CSI in the time domain for a future time interval 225 (e.g., slot), where the extrapolated CSI may be referred to as a CSI reference report. To utilize extrapolation, a CSI-RS measured in at least two different time-domain symbols may be used to generate CSI calculations to extrapolate, for a future time interval 225, the CSI that is reported in the extrapolated CSI report. The extrapolation may consider the channel conditions measured at more than one CSI-RS 215 to estimate the CSI for a future time interval 225. In some examples, the time-domain symbols for each CSI-RS 215 may be separated by at least a threshold of symbols apart from one another. If more than one CSI-RS symbol is not available, or the CSI-RS symbols are not a threshold of number of symbols apart from one another, a stale report may instead be transmitted to the base station 105.

In some examples, base station 105-*a* and UE 115-*a* may communicate via communication link 205. While communicating, CSI processing 210 may be performed on a CSI-RS transmitted from the base station 105-*a* to the UE 115-*a*. During CSI processing 210, UE 115-*a* may be configured to measure at least one CSI-RS 215. In some examples, up to all CSI-RSs 215 used to derive a CSI report may be expected to be received within the CSI reference resource interval 230. The first CSI-RS 215 of the CSI reference resource interval 230 may be indicated to UE 115-*a* to begin at 235 (e.g., $n-n_{CSI_{ref}}-n_{CSI_{span}}$) and the last CSI-RS 215 in the CSI reference resource interval 230 may be indicated to UE 115-*a* to occur at 240 (e.g., $n-n_{CSI_{ref}}$). There may be a configured slot offset between a last of the CSI-RS resources 215 (e.g., CSI-RS 215-*e*) and when the UE 115-*a* is expected to transmit the CSI reference report corresponding to a future time interval 225. The configured slot offset may start at 240 and end before a first of the one or more future time intervals (e.g., 225-*a*). In some cases, there may be multiple CSI-RS 215 resources in one set (e.g., CSI-RS 215-*a*, CSI-RS 215-*b*, CSI-RS 215-*c*, CSI-RS 215-*d*, CSI-RS 215-*e*). UE 115-*a* may measure each CSI-RS 215 of the set and extrapolate in the time domain to generate CSI report 220 that may indicate channel conditions for one or more future time intervals 225 (e.g., future slots). The CSI report 220 may include a set of one or more CSI reference reports corresponding to estimated CSI for one or more future time intervals 225, such as time intervals 225-*a*, 225-*b*, 225-*c*, and 225-*d*. In an example, UE 115-*a* may measure at least two of CSI-RS 215-*a*, CSI-RS 215-*b*, CSI-RS 215-*c*, CSI-RS 215-*d*, and CSI-RS 215-*e* and UE 115-*a* may use the measurements from the CSI-RSs 215 to extrapolate CSI to estimate channel conditions for one or more future time intervals 225, and may include the extrapolated CSI information in the CSI report 220. Base station 105-*a* may receive the CSI report 220 and determine data transmission parameters during one or more future time intervals 225 based on the CSI report 220.

In the case where the CPU budget is not large enough to measure each CSI-RS 215, UE 115-*a* may provide an updated (e.g., adjusted) CSI report using a subset of CSI-RS 215 resources of the set of CSI-RS 215 resources in CSI reference resource interval 230 such that a CPU budget is not exceeded. The CSI report using a subset of CSI-RS 215 resources may be generated using less than the nominal, or configured, or requested number of processing units. The CSI report 220 may be based on CSI measurements of multiple CSI-RS resources 215 that occur at multiple locations in the time-domain. This may avoid a transmission of a stale CSI-report. In some examples, the CSI report 220 configured based on a subset of CSI-RS 215 resources may be less precise than a CSI report 220 configured based on a full set of CSI-RSs (e.g., CSI reference resource interval 230) but may be more precise than alternatively transmitting a stale report.

Figure 3:
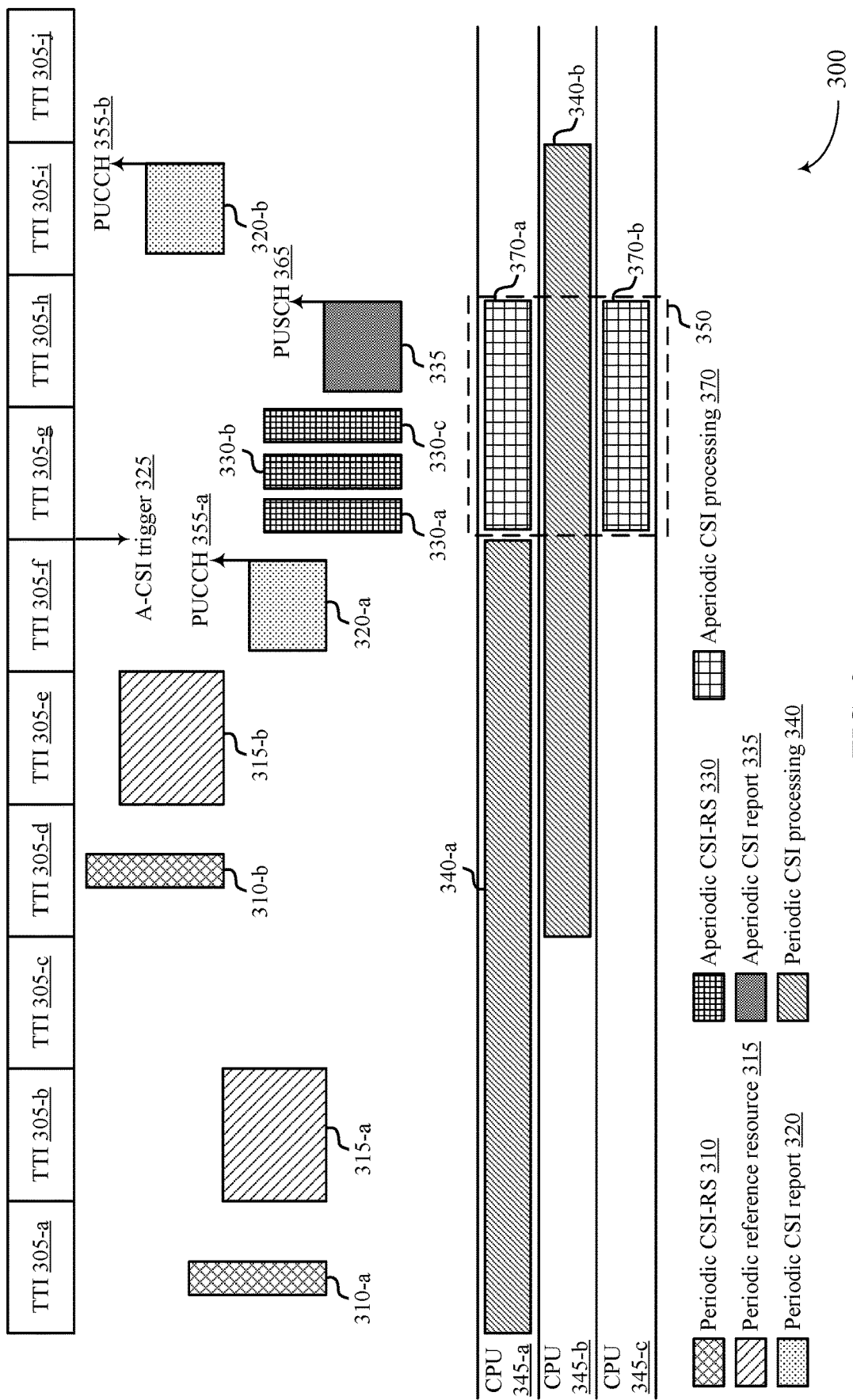
FIG. 3 illustrates an example of a CSI processing configuration that supports an extrapolated CSI report based on a multi-symbol reference signal in accordance with aspects of the present disclosure.

FIG. 3 illustrates an example of a CSI processing configuration 300 that supports an extrapolated CSI report based on a multi-symbol reference signal in accordance with aspects of the present disclosure. The CSI processing configuration 300 may include CSI-RSs 310, CSI reports 320, and CPUs 345 as described with reference to FIGS. 1 and 2. In some cases, CSI reports 320 may be transmitted by a UE 115 based on CSI-RSs 310 where the number of CSI-RSs 310 measured may depend on the number of available CPUs 345. Wireless devices, such as UEs 115 and base stations 105, may implement CSI processing criteria for improved efficiency and throughput of system communications.

CSI-RSs may be measured by a UE 115 to estimate channel quality between a base station 105 and UE 115 and the UE 115 may transmit a CSI report to the base station 105 indicating the channel quality information. The CSI report may indicate measurements for one or more parameters (e.g., CQI, PMI, RI, L1-RSRP, I1) which may be wideband or subband. In some systems (e.g., NR wireless communication system), the number of CPUs 345 supported by the UE 115 may be equal to the number of simultaneous CSI calculations that the UE 115 can process. The CPU may be a calculation engine that may process any kind of CSI report (e.g., aperiodic, periodic, extrapolated).

For some reports (e.g., non-beam related CSI reports), the CSI report 320 may occupy as many CPUs as the number of CSI-RS resources in the CSI-RS resource set for channel measurement (e.g., the report is a non-beam related CSI report when the reportQuantity is not equal to 'cri-RSRP', 'ssb-Index-RSRP' or 'none'). For example, UE 115 capability permitting, each aperiodic CSI-RS 330 such as aperiodic CSI-RSs 330-*a*, 330-*b*, and 330-*c* may be measured and reported in a different CPU 345 (e.g., CPU 345-*a*, 345-*b*, and 345-*c*). A UE 115 may calculate a complete CSI report for each CSI-RS resource in parallel to determine which CSI-RS 310 resource is preferred (e.g., optimal) and may be selected with the CSI-RS resource indicator (CRI).

Each CSI report calculated by the UE 115 may occupy a number of CPUs 345 (e.g., $0_{CPU}$ CPUs) from a starting allocation time to the last symbol of the physical channel (e.g., physical uplink control channel (PUCCH), physical uplink shared channel (PUSCH)) carrying the CSI report. For aperiodic CSI reports 335, the starting allocation time of a CPU 345 may be the last symbol of the physical downlink control channel (PDCCH) which triggered the report (e.g., A-CSI trigger 325). For periodic and semi-persistent CSI reports 320, the starting allocation of the CPU 345 may begin at the time of the occurrence of the latest CSI-RS/IM resource (e.g., CSI-RS 315-*a*, 315-*b*) used to calculate the report. That is, for periodic and semi-persistent reports, the UE 115 may start calculation of the CSI report when the UE 115 has received the last CSI-RS 310 (e.g., CSI-RSs 310-*a*, 310-*b*) before the periodic reference resource 315 (e.g., periodic reference resources 315-*b*, 315-*b*). After the UE 115 has finished transmitting the CSI report, the CPU 345 used may be released (e.g., $0_{CPU}^{(n)}$ CPUs are released) such that the CPU 345 may be used for another CSI report.

When generating a CSI report (e.g., when the UE 115 is triggered with an aperiodic CSI report 335, or the computation starts for a periodic or semi-persistent CSI report 320) the CSI report may be allocated to one or more available CPUs 345. In some cases, there may not be enough CPUs 345 available because the UE 115 is already processing other CSI reports. In conventional techniques, the CSI reporting to be allocated may not be performed by the UE 115 and the UE 115 may instead transmit a stale CSI report (e.g., a previously calculated CSI report stored in memory), or the UE 115 may pad the CSI report with dummy bits. The UE 115 may transmit a stale report in place of dropping the CSI report in order to keep the rate matching procedures unchanged for the PUSCH 365 or PUCCH 355 transmission, which may be error prone.

If multiple CSI reports are allocated to CPUs 345 on a given TTI 305 (e.g., OFDM symbol), they may be ordered according to a set of priority rules. If a number N of CSI reports start occupying their respective CPUs 345 on the same TTI 305 on which $N_{CPU}$–L CPUs are unoccupied, where each CSI report n=0, . . . , N−1 corresponds to a number of occupied CPUs (e.g., $0_{CPU}^{(n)}$), the UE 115 may not update the N-M requested CSI reports with lowest priority where 0≤M≤N is the largest value such that $\Sigma_{n=0}^{M-1} 0_{CPU}^{(n)} \leq N_{CPU}$–L holds. If an $n^{th}$ CSI report that may occupy more than one CPU 345 (e.g., $0_{CPU}^{(n)}>1$), does not fit inside the CPU budget, CPU overflow 350 may result such that the $n^{th}$ CSI report, and any other lower priority CSI reports, would be stale. However, using the techniques described herein, an extrapolation-based CSI report may be derived using a subset of the configured CSI-RS resources for the lower priority CSI report such that the CSI processing for the lower priority report fits the remaining CPU budget, resulting in the UE 115 reporting a non-stale CSI report. The CPU capability of the UE 115 may determine whether partial-CPU occupancy framework for extrapolation-based CSI reports may be supported.

For non-beam related extrapolation-based CSI reports (e.g., a report associated to CSI parameters for a slot in the future) associated with multiple CSI-RS symbols occupying N CPUs, where N may be greater than one (e.g., N>1), such that there may be multiple CSI-RS resource in one set, if there is not enough CPU budget, then the UE 115 may provide an updated (e.g., adjusted) CSI report using N−K CPUs (e.g., use N−K CSI-RS resources of the set) such that the report fits in the CPU budget. As such, the UE 115 may still process a subset or partial of the CSI-RS resources or symbols, and still be able to provide an updated (e.g., adjusted) CSI report rather than transmitting a stale CSI report. For example, a CSI-RS resource set may contain multiple (e.g., N) CSI-RS resources, and to derive a CSI report for a future time interval (e.g., slot), a subset of (e.g., K) CSI-RS resources may be processed to fit in the CPU budget. The CSI report using a subset of the CSI-RS resource set may be generated using less than the nominal, or configured, or requested number of processing units. The performance level for such a CSI report may correspond to a CSI report which is configured with N−K CSI-RS resources. In some examples, at least process 2 different time-domain symbols for the CSI-RS resources may be separated by at least a threshold of symbols apart in order to create a CSI report. Otherwise a stale report may be reported.

The number of CSI-RSs in the subset may be based on the CSI processing capability of a UE 115 such that the number of CSI-RS resources that may be used in the subset may be calculated by subtracting the number of occupied CPUs 345 (e.g., K) from the total number of CSI-RSs in the set or the total number of CPUs 345 utilized for the set (e.g., N) (e.g., CSI-RS resources used in extrapolation of CSI-RS subset may equal N−K). In some cases, at least the same number of CPUs 345 as the number of CSI-RSs in the subset are needed to be free for use (e.g., K CPUs may be needed to be free for use), otherwise a stale report may be transmitted by the UE 115. The number K may be a UE 115 capability and may be at least two (e.g., at least two time-domain occurrences of the channel may be expected to be processed). UE 115 may select the number of CSI-RSs for the subset based on the number of available CPUs to avoid transmitting a stale report. In some cases, the subset may contain at least a preconfigured number of CSI-RS 325 resources (e.g., at least 2 CSI-RS 325 resources).

For example, CSI processing configuration 300 may include periodic CSI reports 320 and aperiodic CSI reports 335. A periodic CSI report 320 may be preconfigured and scheduled at regular intervals. An aperiodic CSI report 335 may occur irregularly and may occur when a trigger (e.g., A-CSI trigger 325) is transmitted to the UE 115 by a base station 105. During TTI 305-*a*, periodic CSI-RS 310 may be the last CSI-RS resource occurrence before periodic reference resource 315 that occurs in TTI 305-*b*. Because periodic CSI-RS 310-*a* is the last CSI-RS occurrence before periodic reference resource 315, a UE 115 may measure parameters associated with periodic CSI-RS 310-*a*. The UE 115 may transmit periodic CSI report 320-*a* in TTI 305-*f* that may indicate the measurements of periodic CSI-RS 310-*a*. Periodic CSI report 320-*a* may be transmitted in a PUCCH, such as PUCCH 355-*a*. The CPU 345-*a* duration may occur from the beginning of the last CSI-RS occurrence (e.g., periodic CSI-RS 310-*a*) before the periodic reference resource 315-*a* up to the last symbol of the physical channel (e.g., PUCCH 355-*a*) transmitting the periodic CSI report 320-*a*. The duration for periodic CSI processing 340-*a* for monitoring, measuring, and transmitting periodic CSI report 320-*a* may be six TTIs 305. Periodic CSI-RS 310-*a*, periodic reference resource 315-*a*, and periodic CSI report 320-*a* may share frequency resources or may have different frequency resources.

Similarly, the UE 115 may monitor periodic CSI-RS 310-*b* in TTI 305-*d* as the last periodic CSI-RS occurrence before periodic reference resource 315-*b* in TTI 305-*e*. The UE 115 may measure periodic CSI-RS 310-*b* and transmit periodic CSI report 320-*b* in TTI 305-*i* based on the measurements of periodic CSI-RS 310-*b*. Periodic CSI report 320-*b* may be transmitted in PUCCH 355-*b*. The duration for periodic CSI processing 340-*b* for monitoring, measuring, and transmitting periodic CSI report 320-*b* may be six TTIs 305. The duration for periodic CSI processing 340-*a* associated with periodic CSI report 320-*a* may be different than the duration for periodic CSI processing 340-*b* associated with periodic CSI report 320-*b*. Periodic CSI-RS 310-*b*, periodic reference resource 315-*b*, and periodic CSI report 320-*b* may share frequency resources or may have different frequency resources.

UE 115 may receive an aperiodic CSI trigger (A-CSI trigger 325) at the beginning of TTI 305-*g*. A-CSI trigger 325 may indicate to the UE 115 to measure one or more incoming aperiodic CSI-RSs 330. For example, the UE 115 may receive aperiodic CSI-RSs 330-*a*, 330-*b*, and 330-*c*. To measure and transmit an aperiodic CSI report 335 for each aperiodic CSI-RS 330, three CPUs 345 may be needed. At the time of the A-CSI trigger 325, CPU 345-*a* for periodic CSI report 320-a may be completed and released for use for another CSI report. However, the capability of the UE 115, in this example, may support three CPUs 345 and CPU 345-b may still be in use for periodic CSI report 320-b. Two CPUs 345 (e.g., CPUs 345-a, and 345-c) may be available at the time of A-CSI trigger 325. In such cases, there may be overflow 350 because three CPUs 345 may be needed for the aperiodic CSI-RS 330 measurements and two CPU 345 may be available.

The UE 115 may determine overflow 350 may occur and instead select a subset of the aperiodic CSI-RSs 330 to measure and configure an extrapolated CSI-RS report based on the measured subset of aperiodic CSI-RSs 330. The UE 115 may determine that two aperiodic CSI-RSs 330 may be used because two CPUs 345 were available. For example, the UE 115 may measure aperiodic CSI-RSs 330-a and 330-b where aperiodic CSI-RS 330-a may be measured in CPU 345-a and aperiodic CSI-RS 330-b may be measured in CPU 345-c. The UE 115 may generate an extrapolated aperiodic CSI report 335 based on the subset of aperiodic CSI-RSs 330 and the UE 115 may transmit the aperiodic CSI report 335 in a PUSCH (e.g., PUSCH 365) in TTI 305-h. The duration for aperiodic CSI processing 370-a for aperiodic CSI-RS 330-a may be two symbols and aperiodic CSI processing 370-b duration for aperiodic CSI-RS 330-b may be two symbols. Aperiodic CSI-RSs 330, and aperiodic CSI report 335 may share frequency resources or may have different frequency resources.

In some cases, multiple (e.g., N) extrapolation-based CSI reports may nominally utilize more than one CPU (e.g., $O_{CPU}^{(n)}$), and the multiple CSI reports may be configured and e.g., $\Sigma_{n=0}^{N-1} O_{CPU}^{(n)}$ may result to CPU overflow 350. It may be the case that the multiple CSI reports may have equal priorities or have the same time-domain behavior. In such cases, an equal number (or approximately an equal number) of CPUs 345 may be subtracted for use by each CSI report, such that each CSI report may have at least one less CPU 345 to use than is needed to measure and send a report for each CSI-RS $$\text{(e.g., } \left\lceil \frac{\left(\sum_{n=0}^{N-1} O_{CPU}^{(n)}\right) - (N_{CPU} - L)}{N} \right\rceil$$

CPUs are subtracted from each CSI report, except one where $$\left\lceil \frac{\left(\sum_{n=0}^{N-1} O_{CPU}^{(n)}\right) - (N_{CPU} - L)}{N} \right\rceil - 1,$$

where L may be the number of occupied CPUs. In such cases, the extrapolated CSI report may be based on one less CSI-RS. In some examples, the number of CPUs 345 that cause the overflow may be subtracted from one of the CSI reports. If, after subtracting the CPUs 345 from the one report, less than two CSI-RS resources remain, then the UE 115 may instead transmit a stale report. If at least two CSI-RS resources remain after the subtraction, then the extrapolated CSI report may be based on the remaining CSI-RS resources.

In some examples, the UE 115 may subtract all CPUs from one of the CSI reports. If less than two CSI-RS resources remain, then the UE 115 may report a stale report for that CSI report. If the priority is the same, then the UE 115 may use just the CSI report index. In some examples, this rule may be applied for extrapolation-based CSI reports which have same priority (or have same time-domain behavior). Otherwise, a CSI report could either fit with the nominal CPU count, or the UE 115 may report a stale report.

In some cases, one or more CSI reports may have different priorities or time-domain behavior. For example, an aperiodic CSI report 335 may be a lower priority than a periodic CSI report 320. If there are not enough available CPUs 345 for the aperiodic CSI report 335, a subset of the aperiodic CSI-RSs 330 may be selected such that the CPU 345 budget is filled but not exceeded. Selecting a subset of CSI-RSs for the aperiodic CSI report 335 may reduce complexity of the aperiodic CSI report 335 and ensure a non-stale report is transmitted. In some examples, a stale report may be transmitted instead of selecting a subset of CSI-RSs. In other examples, multiple periodic CSI reports 320, or multiple aperiodic CSI reports 335 may have different priorities based on which report occurred first in the time domain. For example, two aperiodic CSI reports 335 may be triggered and CPU overflow 350 may occur. The aperiodic CSI report 335 that occurred first in the domain may receive higher priority and may not adjust the number of CPUs 345 used, and the aperiodic CSI report 335 that was triggered second may be assigned a lower priority and may adjust the number of CPUs 345 used to meet the capability of the UE 115 without causing overflow. Alternatively, the lower priority aperiodic report may transmit a stale report.

In some examples, CSI reports may have the same time behavior such that two reports may both be periodic CSI reports or may be semi-persistent CSI reports, or may both be aperiodic CSI reports, and hence may have a same priority during a time period within which the CSI reports are to be generated. In this case, neither report may be dropped (e.g., transmit a stale CSI report) if overflow occurs since both CSI reports have same priority with regards to timing. When a first CSI report and an extrapolated CSI report have a same priority, the first CSI report may be generated using the number of CPUs configured for generating the first CSI report, and the extrapolation-based CSI report may be computed using fewer resources or CPUs (e.g., one or more remaining CPUs) when an overflow condition is identified. Alternatively or additionally, two CSI reports may have different priorities, and if overflow occurs, the lower priority CSI report may be dropped (e.g., a stale CSI report may be transmitted) and a higher priority CSI report may be generated. The higher priority CSI report may be transmitted without reducing the number of CPUs utilized for the extrapolated-based report. In some examples, aperiodic CSI reports may be of a highest priority and periodic CSI reports may be of a lowest priority (e.g., aperiodic CSI reports may be of higher priority than semi-persistent CSI report, which may be of higher priority than periodic CSI reports). Alternatively or additionally, the priorities of the respective CSI reports may be defined in other orders.

When a CSI report to be generated that utilizes nominal $0_{CPU}^{(n)}$ CPUs, due to being configured with $N=0_{CPU}^{(n)}$ CSI-RS resources in a set, is processed with a subset of N–K resource due to CPU overflow 350, the UE 115 may adjust one or more CSI parameters to reflect the subset (e.g., N–K) of the resources. For example, the UE 115 may adjust CSI parameters from the full set of CSI-RS resources to the number of CSI-RS resources that are configured for the subset. In an example, if there is time-domain basis used which is parametrized by the full set of CSI-RS resources (e.g., N), the UE 115 may report a time-domain basis that scales the parameter (e.g., N–K parameter). In some cases, when CPU overflow 350 is not happening, the UE 115 may report the CSI parameters using the original full set of parameters. In some cases, the same CSI report configuration may result in different types of codebook parametrization depending on whether there was CPU overflow 350 or not. In some examples, the UE capability may indicate whether the UE 115 supports the partial-CPU occupancy framework for extrapolation-based CSI reports, or the UE 115 supports a legacy approach. The base station 105 may receive the UE capability and configure the UE 115 to monitor one or more CSI-RS resources based on the UE's support for the partial-CPU occupancy framework for extrapolation-based CSI reports.

At the base station side, base station 105 may keep track of the number of CSI-RSs the UE 115 is configured to measure and the number of CPUs the UE 115 is configured with. When the base station 105 receives the CSI report, the base station 105 may determine the number of CSI-RSs that were used in the subset of CSI-RSs to determine the CSI report based on CSI-RS and CPU 345 counting. The base station 105 may start CPU and CSI-RS counting at an A-CSI trigger 325. The performance level for such reports that use a subset of the CSI-RSs to generate the CSI report may be the same as, or at least comparable to, a CSI report that is configured with N–K CSI-RS resources.

Figure 4:
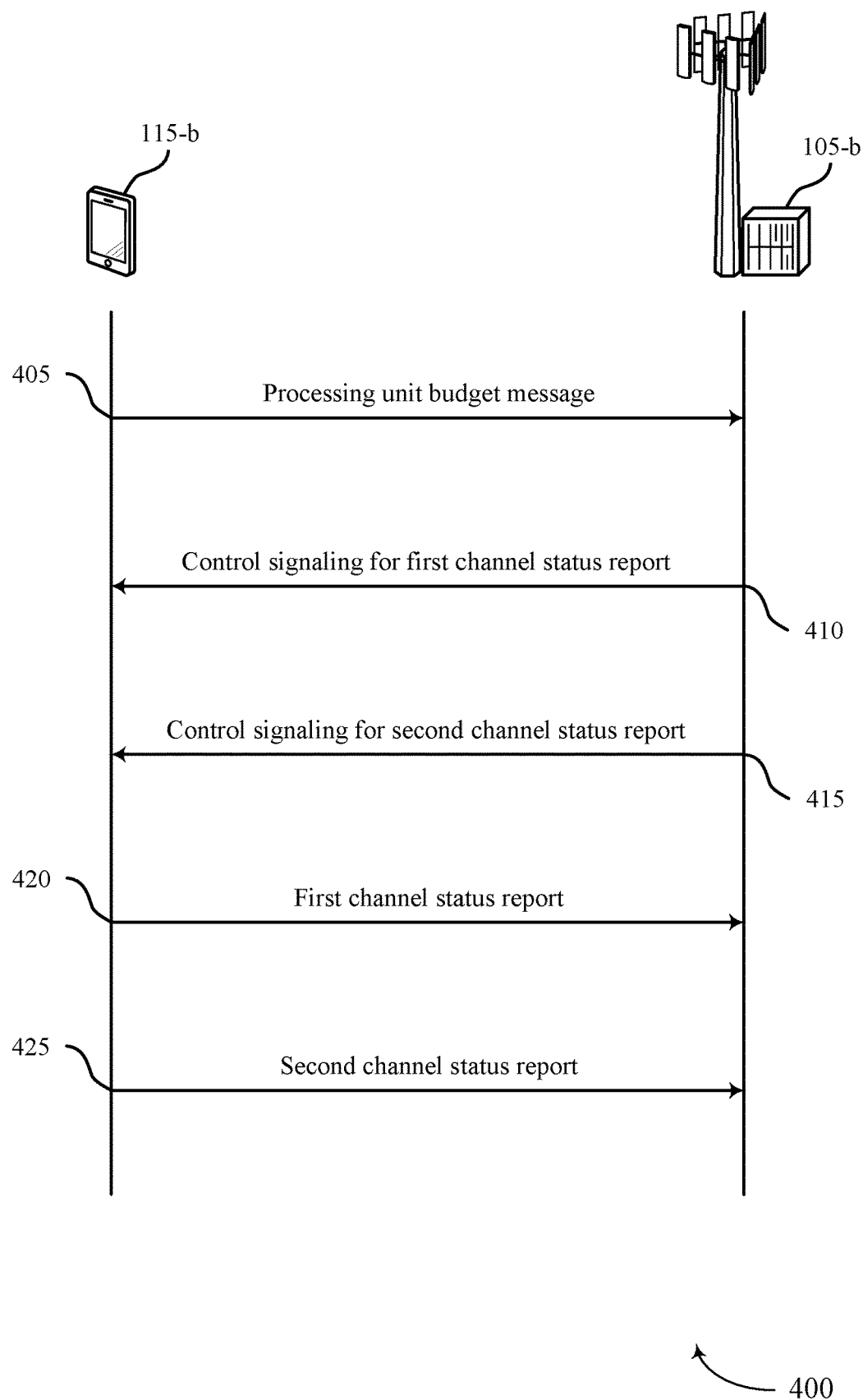
FIG. 4 illustrates an example of a process flow that supports an extrapolated CSI report based on a multi-symbol reference signal in accordance with aspects of the present disclosure.

FIG. 4 illustrates an example of a process flow 400 that supports an extrapolated CSI report based on a multi-symbol reference signal in accordance with aspects of the present disclosure. The process flow 400 may illustrate an example CSI processing procedure. For example, UE 115-*b* may perform a CSI processing procedure based on one or more CSI-RS transmissions from base station 105-*b*. Base station 105-*b* and UE 115-*b* may be examples of the corresponding wireless devices described with reference to FIGS. 1 through 3. In some cases, instead of UE 115-*b* implementing the CSI processing procedure, a different type of wireless device (e.g., a base station 105) may perform CSI processing. Alternative examples of the following may be implemented, where some steps are performed in a different order than described or are not performed at all. In some cases, steps may include additional features not mentioned below, or further steps may be added.

At 405, UE 115-*b* may transmit a processing unit budget message to base station 105-*b* that may indicate a number of processing units that UE 115-*b* may be capable of simultaneously supporting. At 410, UE 115-*b* may receive control signaling from base station 105-*b* that may configure UE 115-*b* to transmit a first channel status report corresponding to at least one first reference signal symbol associated with a first processing unit utilization. A channel status report may refer to a CSI report or an extrapolated CSI report. The first channel status report may be a periodic CSI report, or a semi-persistent CSI report, or an aperiodic CSI report.

At 415, UE 115-*b* may receive control signaling from base station 105-*b* that may configure UE 115-*b* to transmit a second channel status report corresponding to a set of second reference signal symbols associated with a second processing unit utilization, a sum of the first processing unit utilization and the second processing unit utilization exceeding the number of processing units that UE 115-*b* may be capable of simultaneously supporting during a period of time. The second channel status report may be an aperiodic CSI report. In some cases, the control signaling may configure UE 115-*b* to transmit the second channel status report as a CSI report associated with a channel state, such as a channel state quality, for a time interval that occurs after the second channel status report has been transmitted. The CSI report associated with the channel state (e.g., channel state quality) for the time interval that occurs after the second channel status report has been transmitted may include non-beam related information including an RI, or a PMI, or a CQI, or any combination thereof, which may be wideband or for one or more subbands, and may omit, in some examples, RSRP measurements or a L1-SINR report, or a combination thereof. In some cases, the CSI report may be an extrapolation-based CSI report. The second channel status report may be a periodic CSI report, or a semi-persistent CSI report, or an aperiodic CSI report. In some examples, the first channel status report and the second channel status report may have the same time behavior such that both reports may be a periodic channel status report, or a semi-persistent channel status report, or an aperiodic channel status report.

In some implementations, the control signaling may configure UE 115-*b* to transmit the second channel status report using at least two of the set of second reference signal symbols that are separated by a time duration that satisfies a threshold. In other implementations, regarding the control signaling for the second channel status, UE 115-*b* may receive a reporting configuration that may indicate the subset of second reference signal symbols to be used.

In some implementations, UE 115-*b* may identify an overflow condition based on the sum of the first processing unit utilization and the second processing unit utilization exceeding the number of processing units that UE 115-*b* is capable of simultaneously supporting. UE 115-*b* may identify the subset of the processing units, or a subset of the set of second reference signal symbols to process, or both, based on the overflow condition. UE 115-*b* may adjust a parameter configuration based on identifying the overflow condition, where the second channel status report may be generated based on the adjusted parameter configuration. In some cases, there may be a threshold number of reference signal resources to utilize when an overflow condition is identified.

At 420, UE 115-*b* may transmit the first channel status report that is generated by a first processing unit of the number of processing units to base station 105-*b*. At 425, UE 115-*b* may transmit the second channel status report that is generated by a subset of the number of processing units of the second processing unit utilization and includes an updated (e.g., adjusted) channel status report (e.g., non-stale CSI), during a time period in which generation of the first channel status report by the first processing unit at least partially overlaps with generation of the second channel status report by the subset of the number of processing units.

Figure 5:
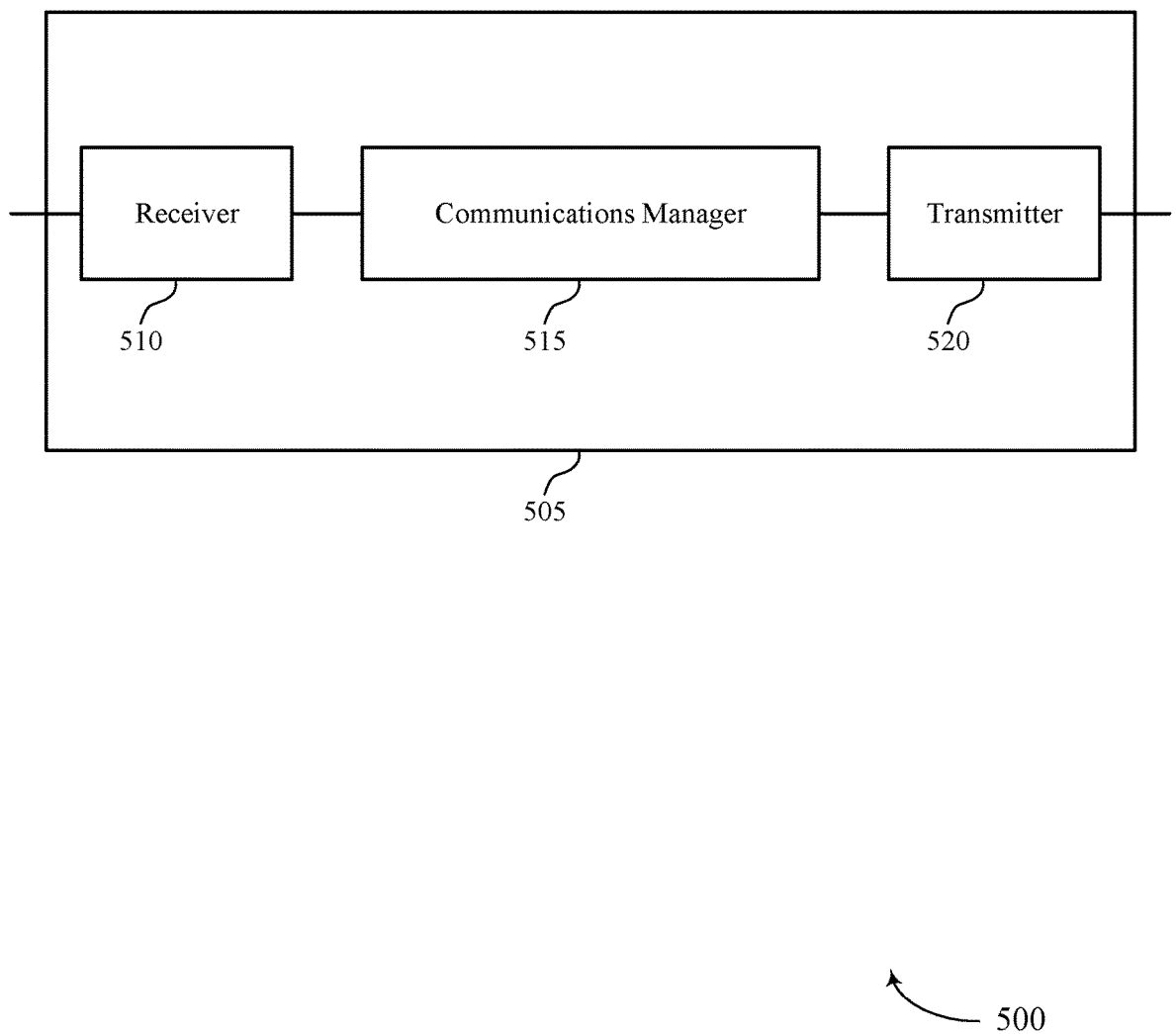
FIGS. 5 and 6 show diagrams of devices that support extrapolated CSI reports based on multi-symbol reference signals in accordance with aspects of the present disclosure.

FIG. 5 shows a diagram 500 of a device 505 that supports an extrapolated CSI report based on a multi-symbol reference signal in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to an extrapolated CSI report based on a multi-symbol RS). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a processing unit budget message that indicates a number of processing units that the UE is capable of simultaneously supporting, receive control signaling that configures the UE to transmit a first channel status report corresponding to at least one first reference signal symbol associated with a first processing unit utilization, receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time, transmit the first channel status report that is generated by a first processing unit of the number of processing units, and transmit the second channel status report that is generated by a subset of the number of processing units of the second processing unit utilization and includes an updated (e.g., adjusted) channel status report that is generated during a time period in which generation of the first channel status report by the first processing unit at least partially overlaps with generation of the second channel status report by the subset of the number of processing units. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

The communications manager 515 as described herein may be implemented to realize one or more potential advantages. One implementation may allow the device 505 to more efficiently process CSI, and more specifically to coordinate extrapolated CSI reports from the device 805 to one or more base stations. For example, the device 805 may identify a subset of CSI-RS resource to use for calculating and transmitting a CSI report to a base station, based on a UE processing unit budget and received control signaling from the base station.

Based on implementing the CSI processing techniques as described herein, a processor of a UE 115 (e.g., controlling the receiver 510, the transmitter 520, or the transceiver 820 as described with reference to FIG. 8) may decrease CSI processing time, and improve data throughput by implementing an extrapolated CSI report based on a subset of CSI-RS reports because the transmission of a stale report may be avoided.

Figure 6:
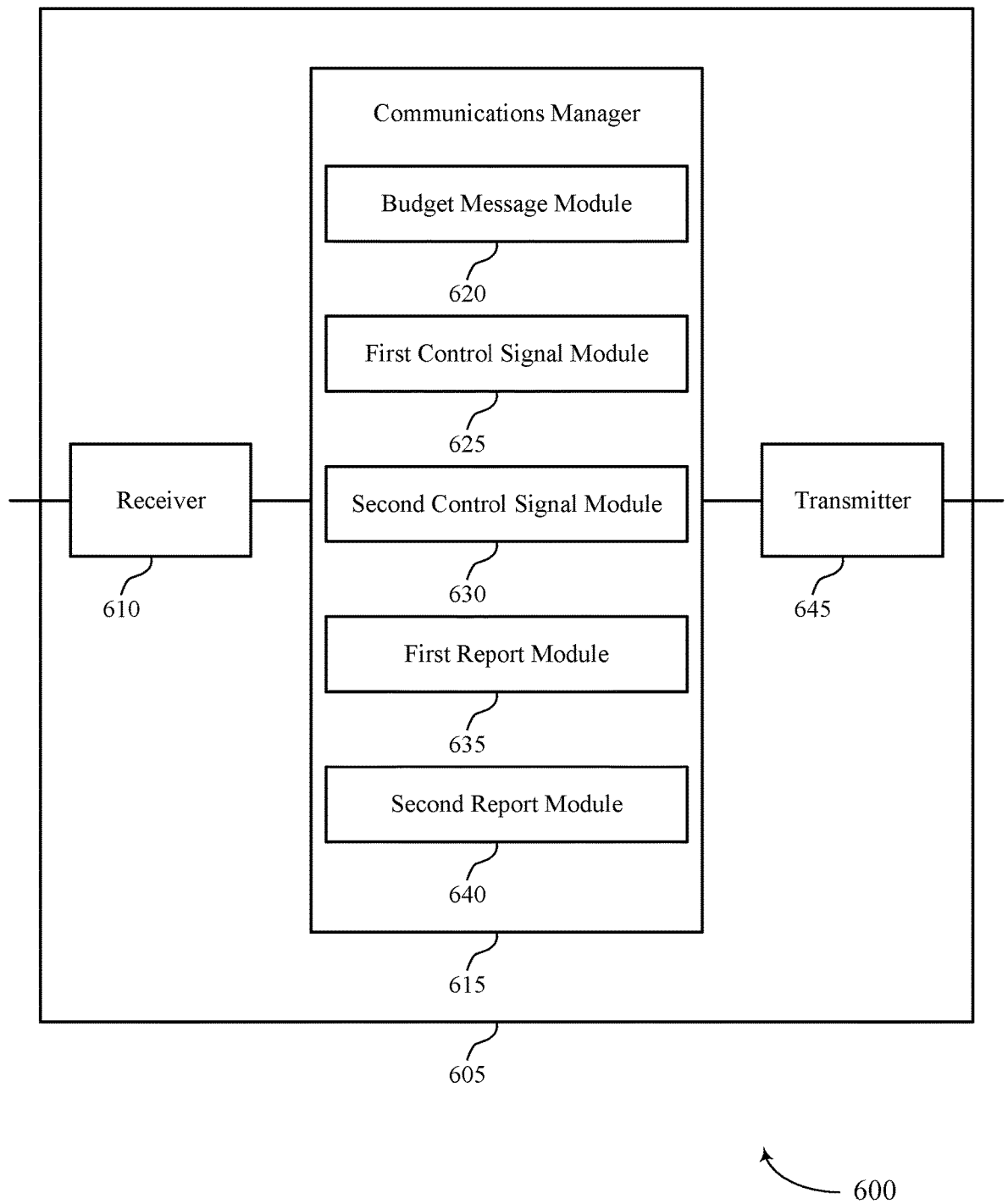

FIG. 6 shows a diagram 600 of a device 605 that supports an extrapolated CSI report based on a multi-symbol reference signal in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to an extrapolated CSI report based on a multi-symbol RS). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a budget message module 620, a first control signal module 625, a second control signal module 630, a first report module 635, and a second report module 640. The communications manager 615 may be an example of aspects of the communications manager 810 described herein.

The budget message module 620 may transmit a processing unit budget message that indicates a number of processing units that the UE is capable of simultaneously supporting.

The first control signal module 625 may receive control signaling that configures the UE to transmit a first channel status report corresponding to at least one first reference signal symbol associated with a first processing unit utilization. The second control signal module 630 may receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time.

The first report module 635 may transmit the first channel status report that is generated by a first processing unit of the number of processing units. The second report module 640 may transmit the second channel status report that is generated by a subset of the number of processing units of the second processing unit utilization and includes an updated (e.g., adjusted) channel status report that is generated during a time period in which generation of the first channel status report by the first processing unit at least partially overlaps with generation of the second channel status report by the subset of the number of processing units.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
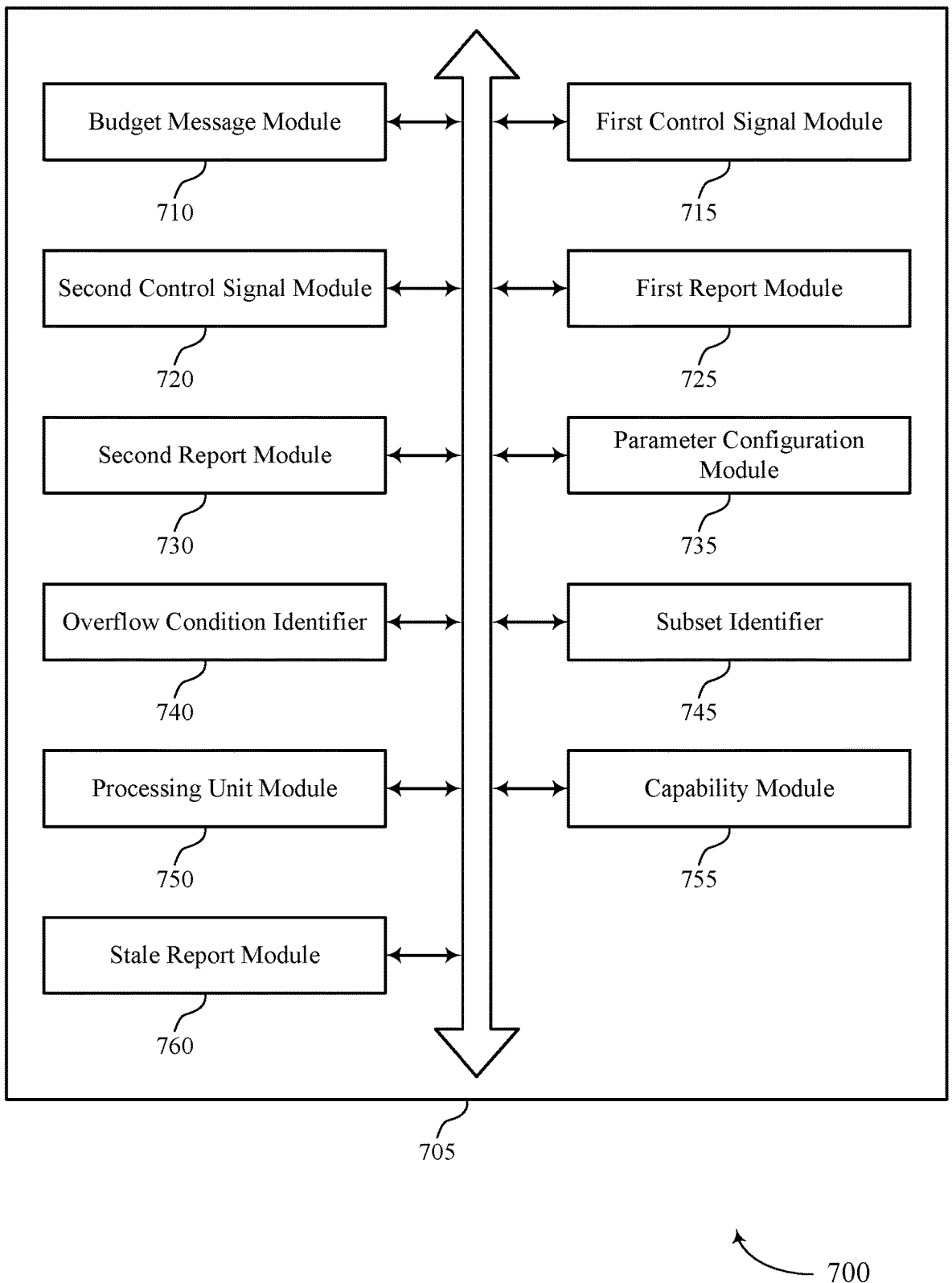
FIG. 7 shows a diagram of a communications manager that supports an extrapolated CSI report based on a multi-symbol reference signal in accordance with aspects of the present disclosure.

FIG. 7 shows a diagram 700 of a communications manager 705 that supports an extrapolated CSI report based on a multi-symbol reference signal in accordance with aspects of the present disclosure. The communications manager 705 may be an example of aspects of a communications manager 515, a communications manager 615, or a communications manager 810 described herein. The communications manager 705 may include a budget message module 710, a first control signal module 715, a second control signal module 720, a first report module 725, a second report module 730, a parameter configuration module 735, an overflow condition identifier 740, a subset identifier 745, a processing unit module 750, a capability module 755, and a stale report module 760. Each of these modules may communicate, directly or indirectly, with one another (e.g., via one or more buses).

The budget message module 710 may transmit a processing unit budget message that indicates a number of processing units that the UE is capable of simultaneously supporting. The first control signal module 715 may receive control signaling that configures the UE to transmit a first channel status report corresponding to at least one first reference signal symbol associated with a first processing unit utilization. The second control signal module 720 may receive, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting. The first report module 725 may transmit the first channel status report that is generated by a first processing unit of the number of processing units. The second report module 730 may transmit the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units.

In some examples, the first control signal module 715 may receive a reporting configuration that indicates a reference resource, where the at least one first reference signal symbol is identified in time relative to the reference resource.

In some examples, the second control signal module 720 may receive the control signaling that configures the UE to transmit the second channel status report as a CSI report associated with a channel state, such as a channel state quality, for a time interval that occurs after the second channel status report has been transmitted. In some cases, the CSI report may be an extrapolation-based CSI report. In some examples, the second control signal module 720 may receive the control signaling that configures the UE to transmit the second channel status report using at least two of the set of second reference signal symbols that are separated by a time duration that satisfies a threshold. In some examples, the second control signal module 720 may receive a reporting configuration that indicates the set of second reference signal symbols. In some cases, receiving the control signaling that configures the UE to transmit a second channel status report is based on the processing unit budget message.

In some examples, the second control signal module 720 may receive the control signaling that configures the UE with a parameter configuration for generating the second channel status. In some cases, the CSI report associated with the channel state (e.g., channel state quality) for the time interval that occurs after the second channel status report has been transmitted includes non-beam related information including an RI, or a PMI, or a CQI, or any combination thereof. In some cases, the second channel status report occupies up to all remaining available processing units of the number of processing units that are not utilized for generation of the first channel status report. In some cases, the control signaling includes downlink control information (DCI), a MAC CE, an RRC message, or a combination thereof.

In some cases, the first channel status report is a periodic CSI report, or a semi-persistent CSI report, or an aperiodic CSI report, and the second channel status report is an aperiodic CSI report. In some cases, the first channel status report may be a periodic CSI report, or a semi-persistent CSI report, or an aperiodic CSI report that has a same time behavior as the second channel status report that may be a periodic CSI report, or a semi-persistent CSI report, or an aperiodic CSI report.

In some examples, the second report module 730 may receive the control signaling that indicates a defined number of reference signal resources to use for deriving the second channel status report for a future time interval and a threshold number of the defined number of reference signal resources to utilize when an overflow condition is identified, where the second report is generated using at least the threshold number of the reference signal resources. The defined number of reference signal resources may be a nominal, or configured, or requested number of reference signal resources. In some examples, the second report module 730 may generate the second channel status report associated with at least one channel status parameter for a time interval that occurs after the second channel status report has been transmitted.

In some examples, the second report module 730 may generate the second channel status report to satisfy a performance criterion associated with the subset of the number of processing units, or the number of reference signal symbols, or a combination thereof. In some cases, the second channel status report is a CSI report that indicates a wideband RI, or a narrowband RI, or a wideband PMI, or a narrowband PMI, or a wideband CQI, or a narrowband CQI, or any combination thereof. In some cases, the second status report does not include an RSRP report, an L1-SINR, or a combination thereof.

The parameter configuration module 735 may adjust the parameter configuration based on the sum of the first processing unit utilization and the second processing unit utilization exceeding the number of processing units that the UE is capable of simultaneously supporting, where the second channel status report is generated based on the adjusted parameter configuration. In some examples, the parameter configuration module 735 may adjust a parameter configuration based on identifying the overflow condition, where the second channel status report is generated based on the adjusted parameter configuration.

The overflow condition identifier 740 may identify an overflow condition based on the sum of the first processing unit utilization and the second processing unit utilization exceeding the number of processing units that the UE is capable of simultaneously supporting. In some examples, the overflow condition identifier 740 may identify an overflow condition based at least part on identifying that a set of channel status reports are configured, the set of channel status reports including the second channel status report. The subset identifier 745 may identify the subset of the processing units, or a subset of the set of second reference signal symbols to process, or both, based on the overflow condition.

The processing unit module 750 may identify a defined number of processing units to be utilized for generating the second channel status report that is a channel status report indicating a channel state (e.g., a channel state quality) of a time interval that occurs after the second channel status report has been transmitted, where the overflow condition is identified based on the defined number of processing units. In some examples, the processing unit module 750 may adjust allocation of the number of processing units for generation of a respective channel status report of the set of channel status reports based on the overflow condition.

In some examples, the processing unit module 750 may subtract a first number of processing units from the allocation for each of the respective channel status reports of a first subset of the set of channel status reports, and a second number of processing units from the allocation for a second subset of the set of channel status reports. In some examples, the processing unit module 750 may subtract all allocated processing units to generation of a first channel status report of the set of channel status reports, where the first channel status report is selected based on an index or a priority rule. In some examples, the processing unit module 750 may de-allocate up to all processing units allocated to generation of a first channel status report of the set of channel status reports, where the first channel status report is selected based on an index or a priority rule.

The capability module 755 may transmit a capability message that indicates that the UE supports reporting an updated (e.g., adjusted) channel status report associated with a channel state (e.g., a channel state quality) for a time interval that occurs after the second channel status report has been transmitted generated by the subset of the processing units that is smaller than a defined number of processing units for the second processing unit utilization. The second channel status report may be generated using less than the nominal, or configured, or requested number of processing units. The stale report module 760 may report a stale channel status report as the first channel status report.

Figure 8:
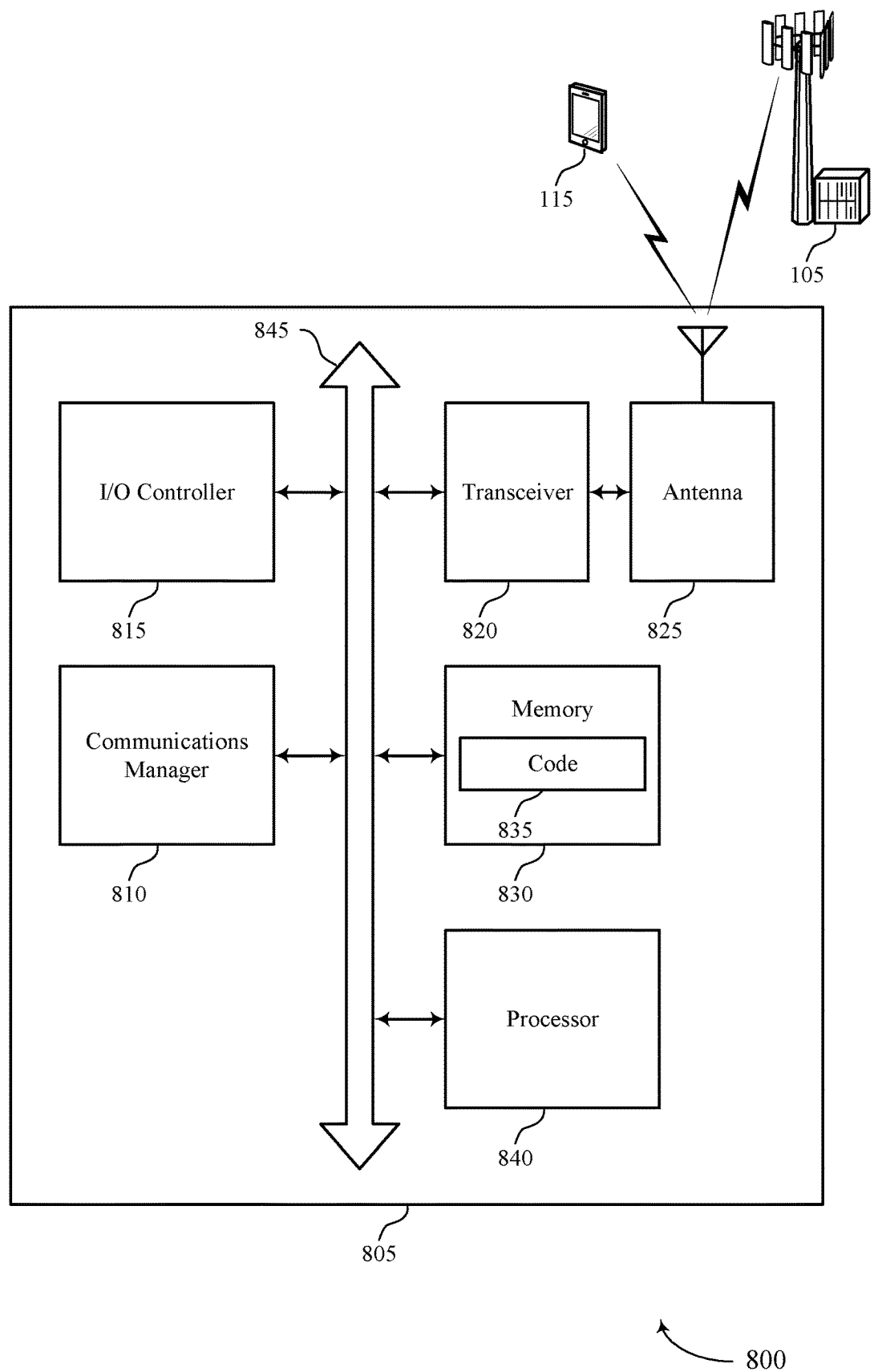
FIG. 8 shows a diagram of a system including a device that supports an extrapolated CSI report based on a multi-symbol reference signal in accordance with aspects of the present disclosure.

FIG. 8 shows a diagram of a system 800 including a device 805 that supports an extrapolated CSI report based on a multi-symbol reference signal in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a processing unit budget message that indicates a number of processing units that the UE is capable of simultaneously supporting, receive control signaling that configures the UE to transmit a first channel status report corresponding to at least one first reference signal symbol associated with a first processing unit utilization, receive, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting, transmit the first channel status report that is generated by a first processing unit of the number of processing units, and transmit the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting an extrapolated CSI report based on a multi-symbol RS).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
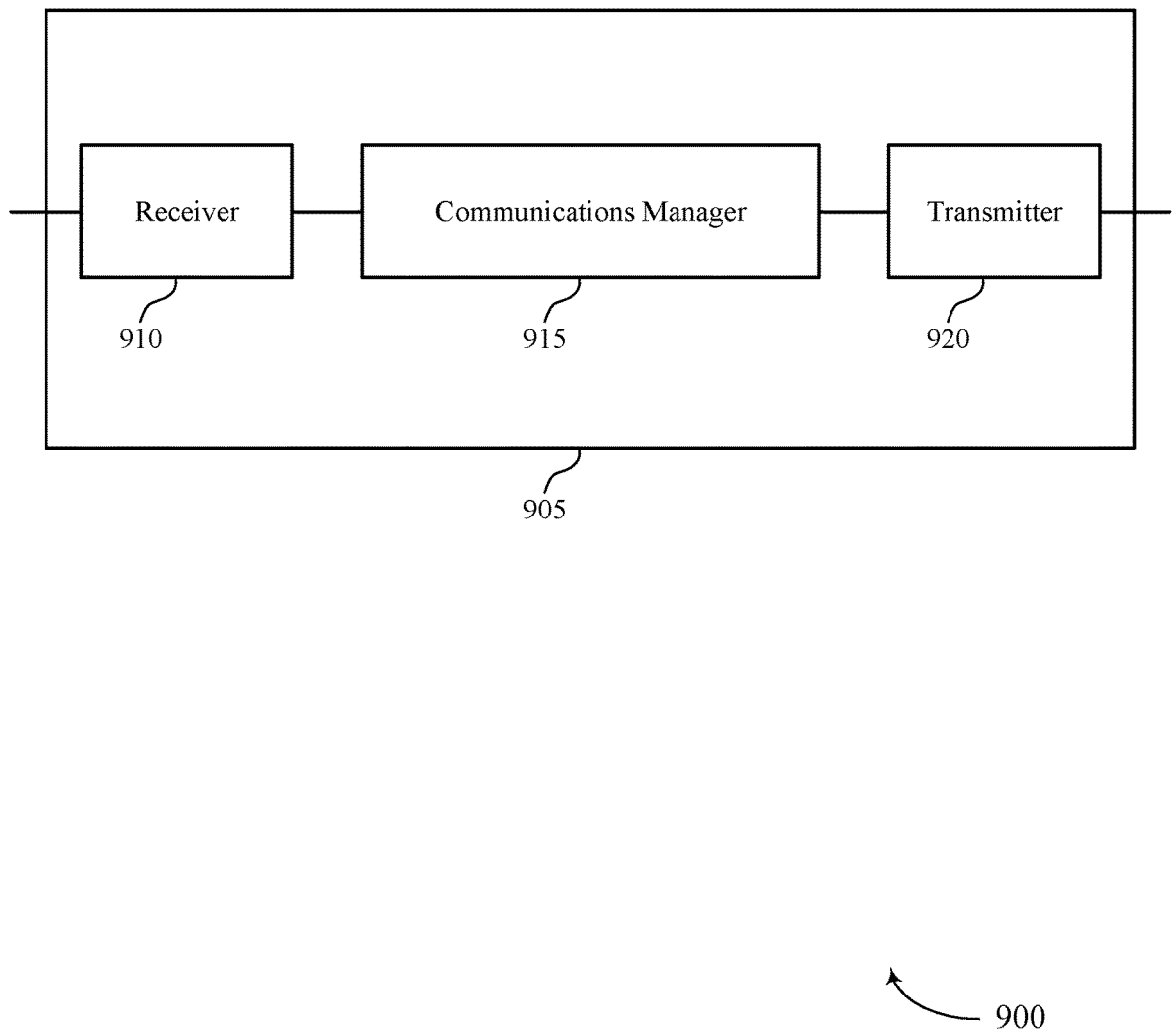
FIGS. 9 and 10 show diagrams of devices that support extrapolated CSI reports based on multi-symbol reference signals in accordance with aspects of the present disclosure.

FIG. 9 shows a diagram 900 of a device 905 that supports an extrapolated CSI report based on a multi-symbol reference signal in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to an extrapolated CSI report based on a multi-symbol RS). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a processing unit budget message that indicates a number of processing units that a UE is capable of simultaneously supporting, transmit control signaling that configures the UE to transmit a first channel status report corresponding to at least one first reference signal symbol associated with a first processing unit utilization, transmit, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting, receive the first channel status report that is generated by a first processing unit of the number of processing units, and receive the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
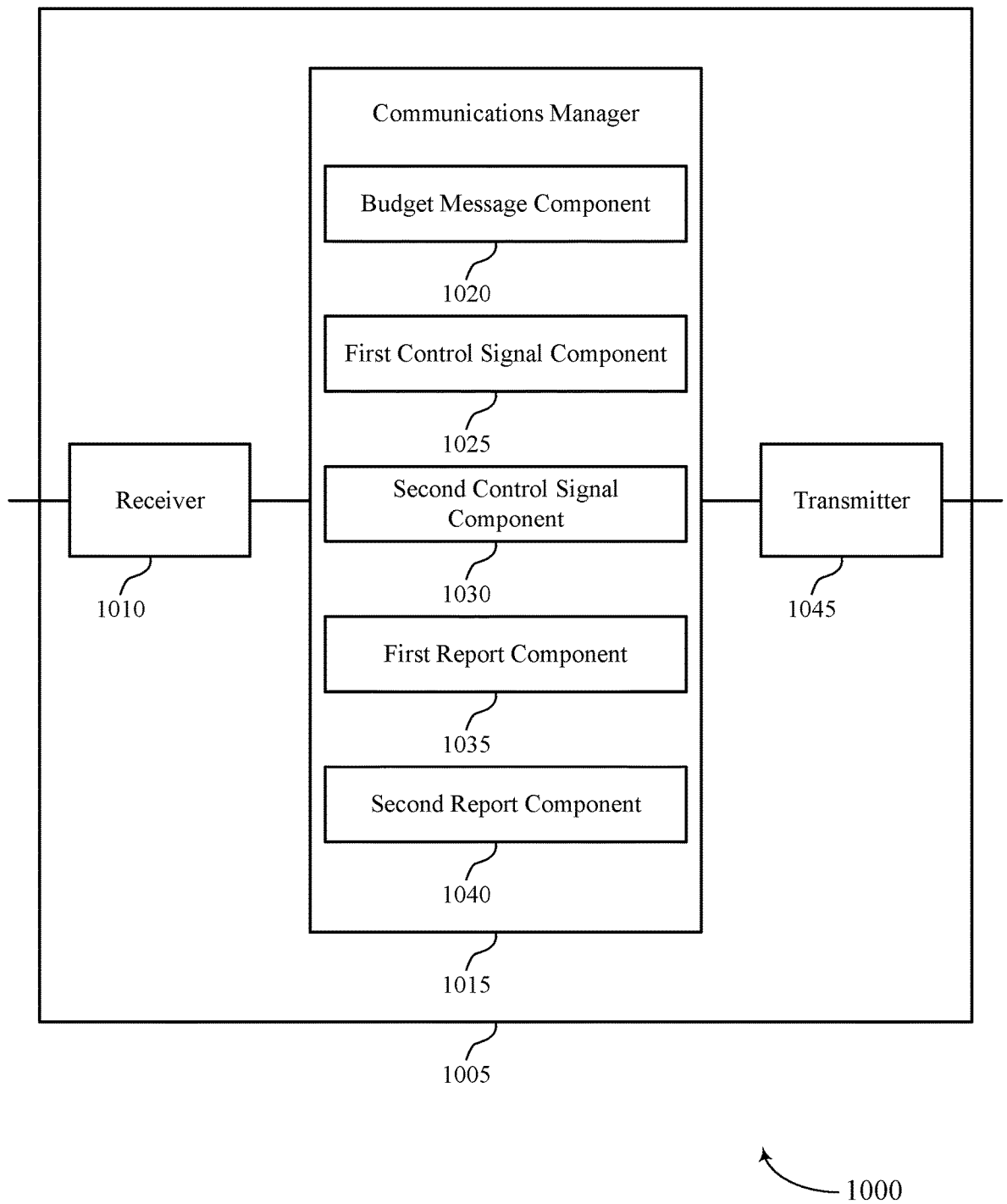

FIG. 10 shows a diagram 1000 of a device 1005 that supports an extrapolated CSI report based on a multi-symbol reference signal in accordance with aspects of the present disclosure. The device 1005 may be an example of aspects of a device 905, or a base station 105 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to an extrapolated CSI report based on a multi-symbol RS). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a budget message component 1020, a first control signal component 1025, a second control signal component 1030, a first report component 1035, and a second report component 1040. The communications manager 1015 may be an example of aspects of the communications manager 1210 described herein.

The budget message component 1020 may receive a processing unit budget message that indicates a number of processing units that a UE is capable of simultaneously supporting. The first control signal component 1025 may transmit control signaling that configures the UE to transmit a first channel status report corresponding to at least one first reference signal symbol associated with a first processing unit utilization.

The second control signal component 1030 may transmit, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting.

The first report component 1035 may receive the first channel status report that is generated by a first processing unit of the number of processing units. The second report component 1040 may receive the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
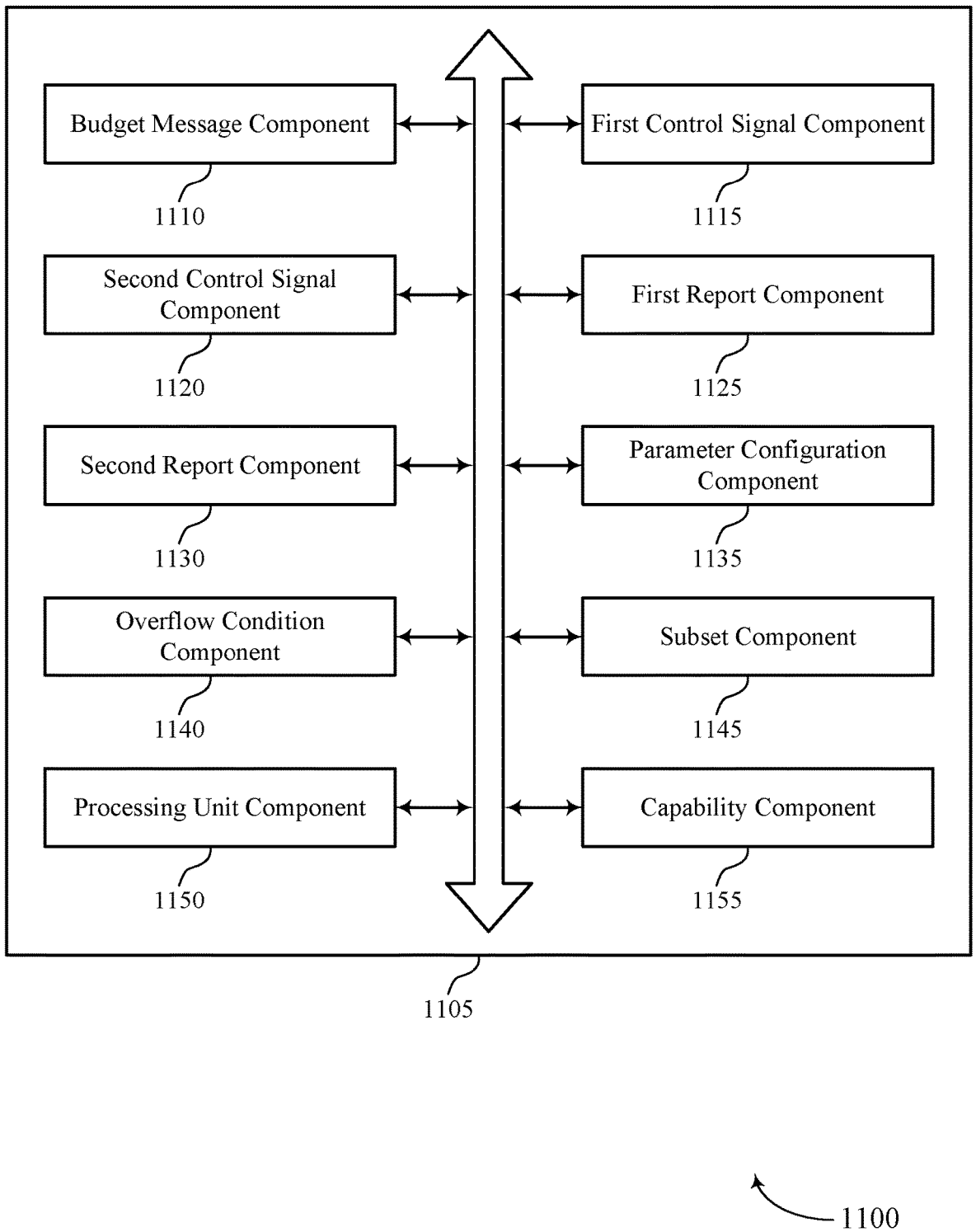
FIG. 11 shows a diagram of a communications manager that supports an extrapolated CSI report based on a multi-symbol reference signal in accordance with aspects of the present disclosure.

FIG. 11 shows a diagram 1100 of a communications manager 1105 that supports an extrapolated CSI report based on a multi-symbol reference signal in accordance with aspects of the present disclosure. The communications manager 1105 may be an example of aspects of a communications manager 915, a communications manager 1015, or a communications manager 1210 described herein. The communications manager 1105 may include a budget message component 1110, a first control signal component 1115, a second control signal component 1120, a first report component 1125, a second report component 1130, a parameter configuration component 1135, an overflow condition component 1140, a subset component 1145, a processing unit component 1150, and a capability component 1155. Each of these modules may communicate, directly or indirectly, with one another (e.g., via one or more buses).

The budget message component 1110 may receive a processing unit budget message that indicates a number of processing units that a UE is capable of simultaneously supporting. The first control signal component 1115 may transmit control signaling that configures the UE to transmit a first channel status report corresponding to at least one first reference signal symbol associated with a first processing unit utilization. The second control signal component 1120 may transmit, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting. The first report component 1125 may receive the first channel status report that is generated by a first processing unit of the number of processing units. The second report component 1130 may receive the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units.

In some examples, the first control signal component 1115 may transmit a reporting configuration that indicates a reference resource, where the at least one first reference signal symbol is identified in time relative to the reference resource.

In some examples, the second control signal component 1120 may transmit the control signaling that configures the UE to transmit the second channel status report as a CSI report associated with a channel state (e.g., a channel state quality) for a time interval that occurs after the second channel status report has been transmitted. In some cases, the CSI report may be an extrapolation-based CSI report. In some examples, the second control signal component 1120 may transmit the control signaling that configures the UE to transmit the second channel status report using at least two of the set of second reference signal symbols that are separated by a time duration that satisfies a threshold. In some cases, transmitting the control signaling that configures the UE to transmit a second channel status report is based on the processing unit budget message.

In some examples, the second control signal component 1120 may transmit a reporting configuration that indicates the set of second reference signal symbols. In some examples, the second control signal component 1120 may transmit the control signaling that configures the UE with a parameter configuration for generating the second channel status. In some cases, the control signaling includes DCI, a MAC CE, an RRC message, or a combination thereof.

In some examples, the second report component 1130 may transmit the control signaling that indicates a defined number of reference signal resources to use for deriving the second channel status report for a future time interval and a threshold number of the defined number of reference signal resources to utilize when an overflow condition is identified, where the second report is generated using at least the threshold number of the reference signal resources. In some cases, the second channel status report occupies up to all remaining available processing units of the number of processing units that are not utilized for generation of the first channel status report.

In some cases, the second channel status report is a CSI report that indicates a wideband RI, or a narrowband RI, or a wideband PMI, or a narrowband PMI, or a wideband CQI, or a narrowband CQI, or any combination thereof. In some cases, the first channel status report is a periodic CSI report, or a semi-persistent CSI report, or an aperiodic CSI report, and the second channel status report is an aperiodic CSI report. In some cases, the first channel status report is a periodic CSI report, or a semi-persistent CSI report, or an aperiodic CSI report that has a same time behavior as the second channel status report that is a periodic CSI report, or a semi-persistent CSI report, or an aperiodic CSI report. In some cases, the second status report does not include an RSRP report, an L1-SINR, or a combination thereof.

The parameter configuration component 1135 may adjust the parameter configuration based on the sum of the first processing unit utilization and the second processing unit utilization exceeding the number of processing units that the UE is capable of simultaneously supporting, where the second channel status report is generated based on the adjusted parameter configuration. In some examples, the parameter configuration component 1135 may adjust a parameter configuration based on identifying the overflow condition, where the second channel status report is generated based on the adjusted parameter configuration.

The overflow condition component 1140 may identify an overflow condition based on the sum of the first processing unit utilization and the second processing unit utilization exceeding the number of processing units that the UE is capable of simultaneously supporting. The subset component 1145 may identify the subset of the processing units, or a subset of the set of second reference signal symbols to process, or both, based on the overflow condition.

The processing unit component 1150 may identify a defined number of processing units to be utilized for generating the second channel status report that is an extrapolated channel status report indicating a channel state (e.g., channel state quality) of a time interval that occurs after the second channel status report has been transmitted, where the overflow condition is identified based on the defined number of processing units. The capability component 1155 may receive a capability message that indicates that the UE supports reporting an updated (e.g., adjusted) channel status report associated with a channel state (e.g., a channel state quality) for a time interval that occurs after the second channel status report has been transmitted generated by the subset of the processing units that is smaller than a defined number of processing units for the second processing unit utilization. The second channel status report may be generated using less than the nominal, or configured, or requested number of processing units.

Figure 12:
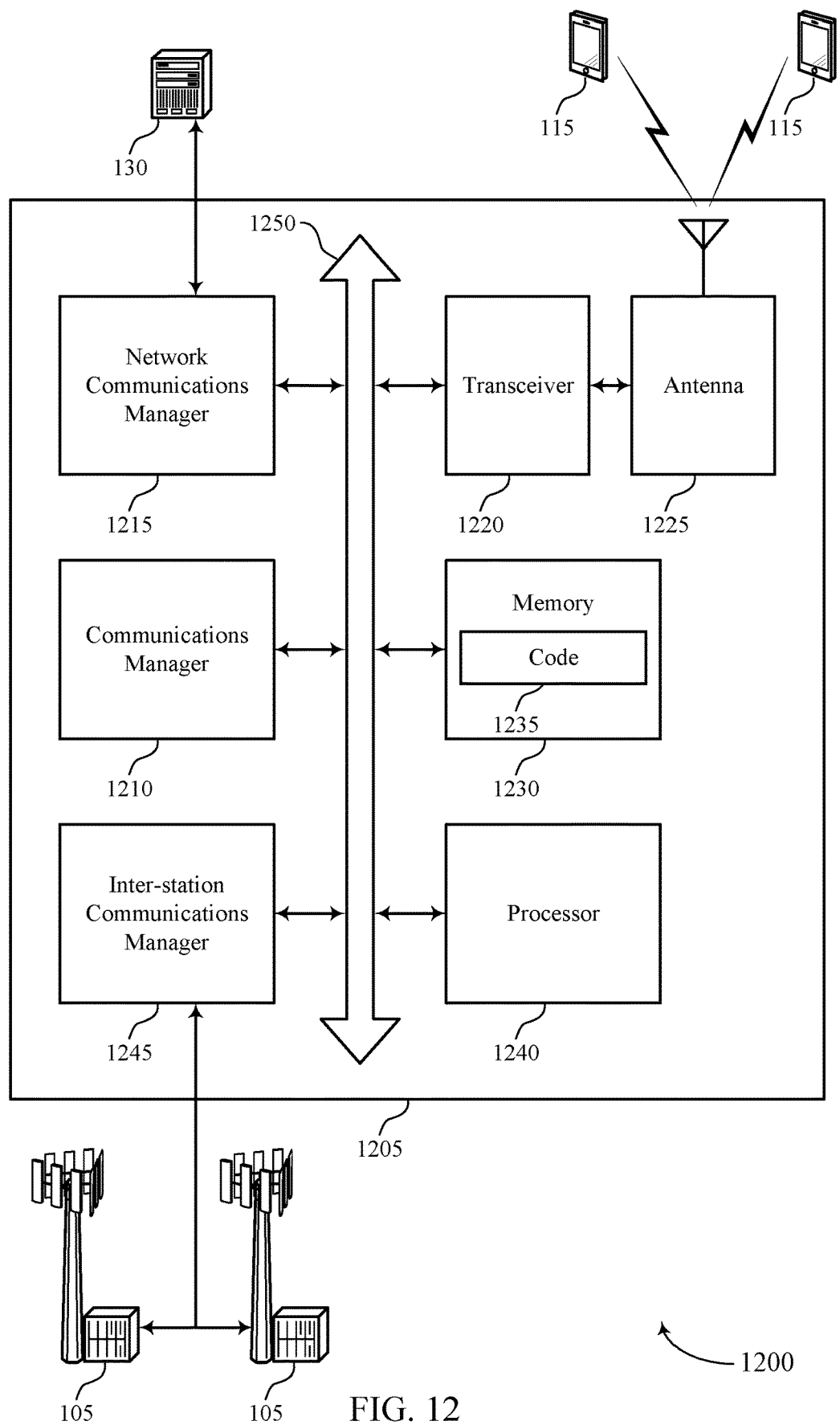
FIG. 12 shows a diagram of a system including a device that supports an extrapolated CSI report based on a multi-symbol reference signal in accordance with aspects of the present disclosure.

FIG. 12 shows a diagram of a system 1200 including a device 1205 that supports an extrapolated CSI report based on a multi-symbol reference signal in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a processing unit budget message that indicates a number of processing units that a UE is capable of simultaneously supporting, transmit control signaling that configures the UE to transmit a first channel status report corresponding to at least one first reference signal symbol associated with a first processing unit utilization, transmit, based on the processing unit budget, control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting, receive the first channel status report that is generated by a first processing unit of the number of processing units, and receive the second channel status report that is generated by a subset of the number of processing units to include updated (e.g., adjusted) channel status data and during a time period in which generation of the first channel status report by the first processing unit at least partially overlaps with generation of the second channel status report by the subset of the number of processing units.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting an extrapolated CSI report based on a multi-symbol RS).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
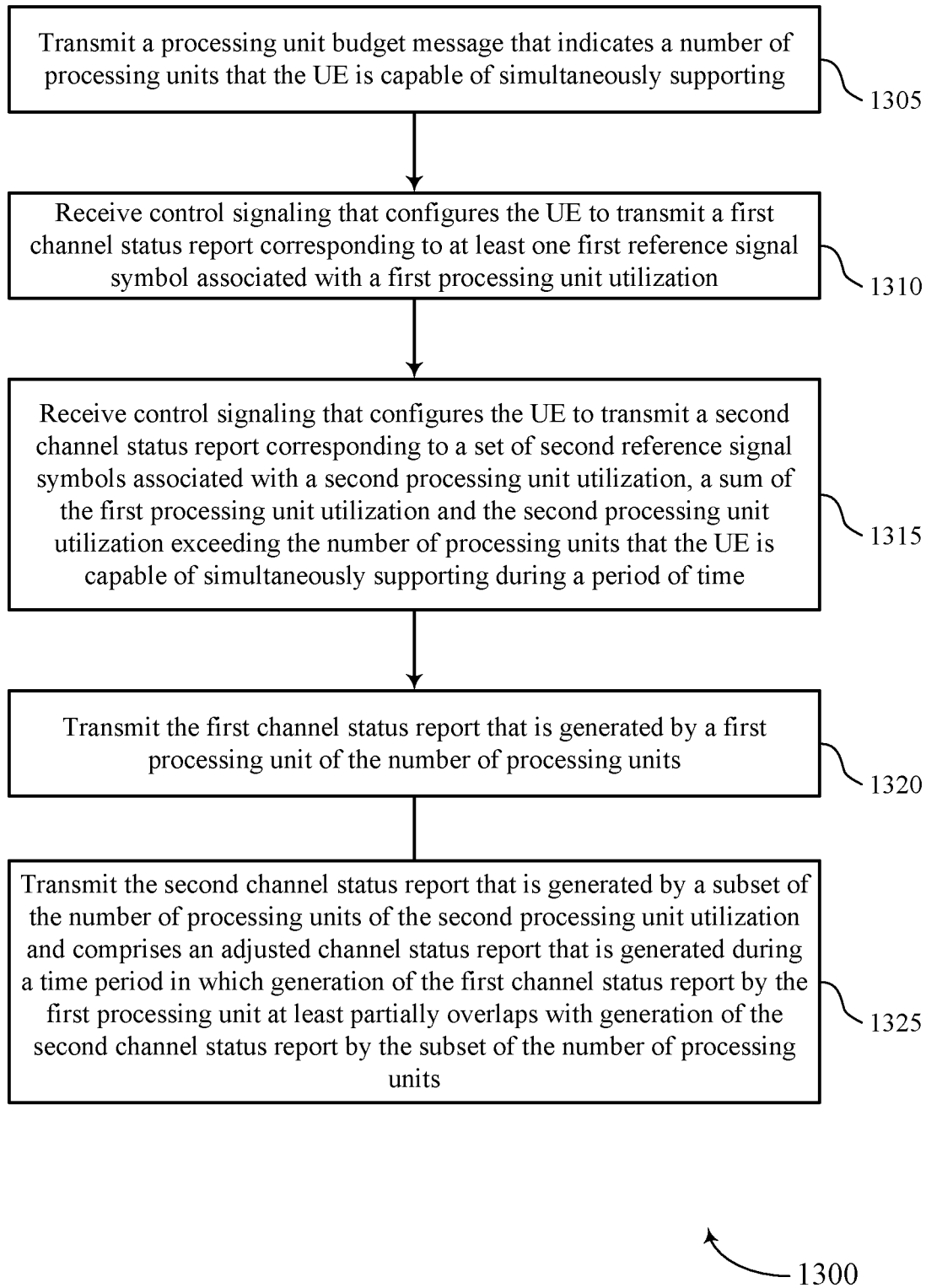
FIGS. 13 through 16 show flowcharts illustrating methods that support extrapolated CSI reports based on multi-symbol reference signals in accordance with aspects of the present disclosure.

FIG. 13 shows a flowchart illustrating a method 1300 that supports an extrapolated CSI report based on a multi-symbol reference signal in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit a processing unit budget message that indicates a number of processing units that the UE is capable of simultaneously supporting. The operations of 1305 may be performed according to the methods described herein. In some examples, aspects of the operations of 1305 may be performed by a budget message module as described with reference to FIGS. 5 through 8.

At 1310, the UE may receive control signaling that configures the UE to transmit a first channel status report corresponding to at least one first reference signal symbol associated with a first processing unit utilization. The operations of 1310 may be performed according to the methods described herein. In some examples, aspects of the operations of 1310 may be performed by a first control signal module as described with reference to FIGS. 5 through 8.

At 1315, the UE may receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time. The operations of 1315 may be performed according to the methods described herein. In some examples, aspects of the operations of 1315 may be performed by a second control signal module as described with reference to FIGS. 5 through 8.

At 1320, the UE may transmit the first channel status report that is generated by a first processing unit of the number of processing units. The operations of 1320 may be performed according to the methods described herein. In some examples, aspects of the operations of 1320 may be performed by a first report module as described with reference to FIGS. 5 through 8.

At 1325, the UE may transmit the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units. The operations of 1325 may be performed according to the methods described herein. In some examples, aspects of the operations of 1325 may be performed by a second report module as described with reference to FIGS. 5 through 8.

Figure 14:
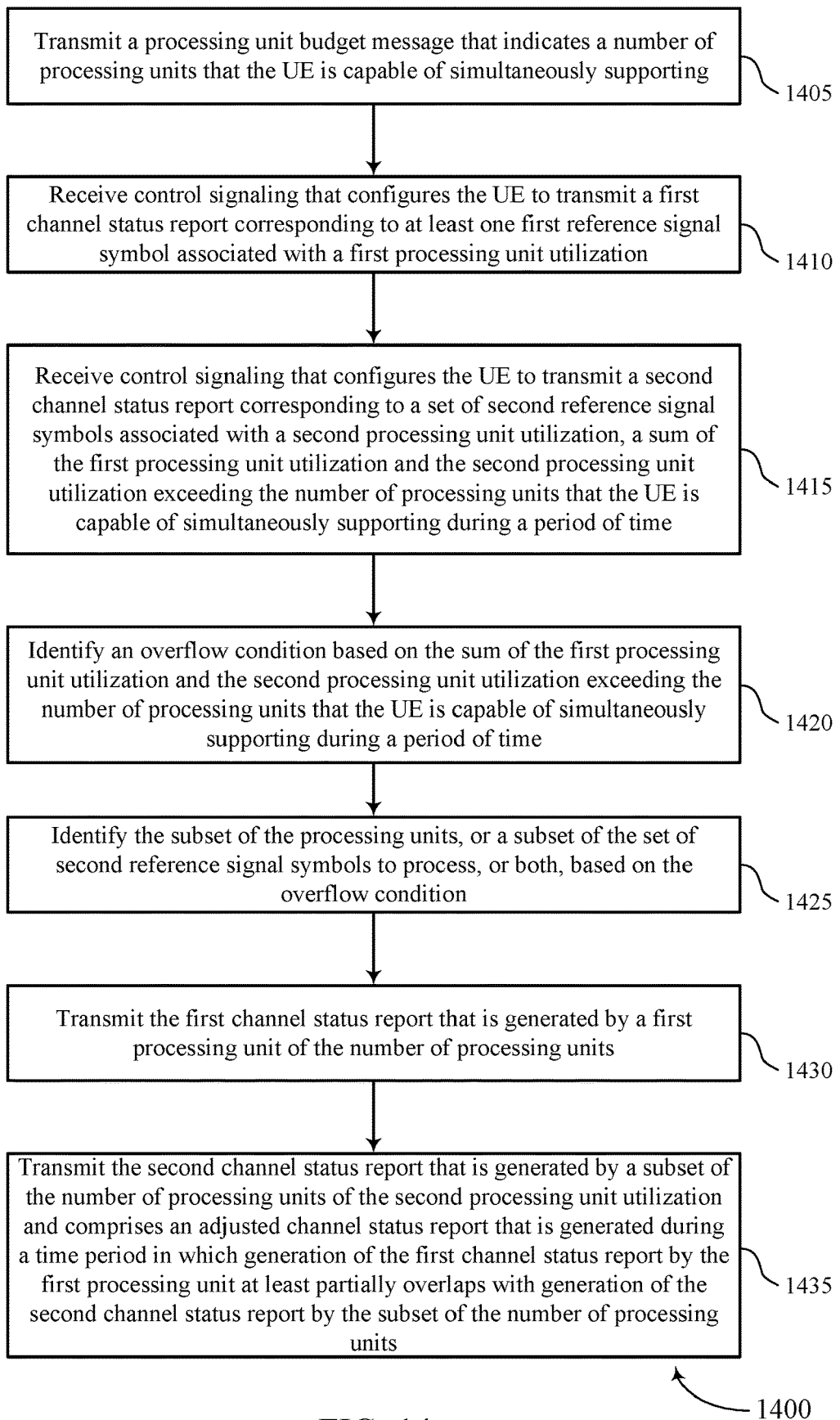

FIG. 14 shows a flowchart illustrating a method 1400 that supports an extrapolated CSI report based on a multi-symbol reference signal in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a processing unit budget message that indicates a number of processing units that the UE is capable of simultaneously supporting. The operations of 1405 may be performed according to the methods described herein. In some examples, aspects of the operations of 1405 may be performed by a budget message module as described with reference to FIGS. 5 through 8.

At 1410, the UE may receive control signaling that configures the UE to transmit a first channel status report corresponding to at least one first reference signal symbol associated with a first processing unit utilization. The operations of 1410 may be performed according to the methods described herein. In some examples, aspects of the operations of 1410 may be performed by a first control signal module as described with reference to FIGS. 5 through 8.

At 1415, the UE may receive control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time. The operations of 1415 may be performed according to the methods described herein. In some examples, aspects of the operations of 1415 may be performed by a second control signal module as described with reference to FIGS. 5 through 8.

At 1420, the UE may identify an overflow condition based on the sum of the first processing unit utilization and the second processing unit utilization exceeding the number of processing units that the UE is capable of simultaneously supporting during a period of time. The operations of 1420 may be performed according to the methods described herein. In some examples, aspects of the operations of 1420 may be performed by an overflow condition identifier as described with reference to FIGS. 5 through 8.

At 1425, the UE may identify the subset of the processing units, or a subset of the set of second reference signal symbols to process, or both, based on the overflow condition. The operations of 1425 may be performed according to the methods described herein. In some examples, aspects of the operations of 1425 may be performed by a subset identifier as described with reference to FIGS. 5 through 8.

At 1430, the UE may transmit the first channel status report that is generated by a first processing unit of the number of processing units. The operations of 1430 may be performed according to the methods described herein. In some examples, aspects of the operations of 1430 may be performed by a first report module as described with reference to FIGS. 5 through 8.

At 1435, the UE may transmit the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units. The operations of 1435 may be performed according to the methods described herein. In some examples, aspects of the operations of 1435 may be performed by a second report module as described with reference to FIGS. 5 through 8.

Figure 15:
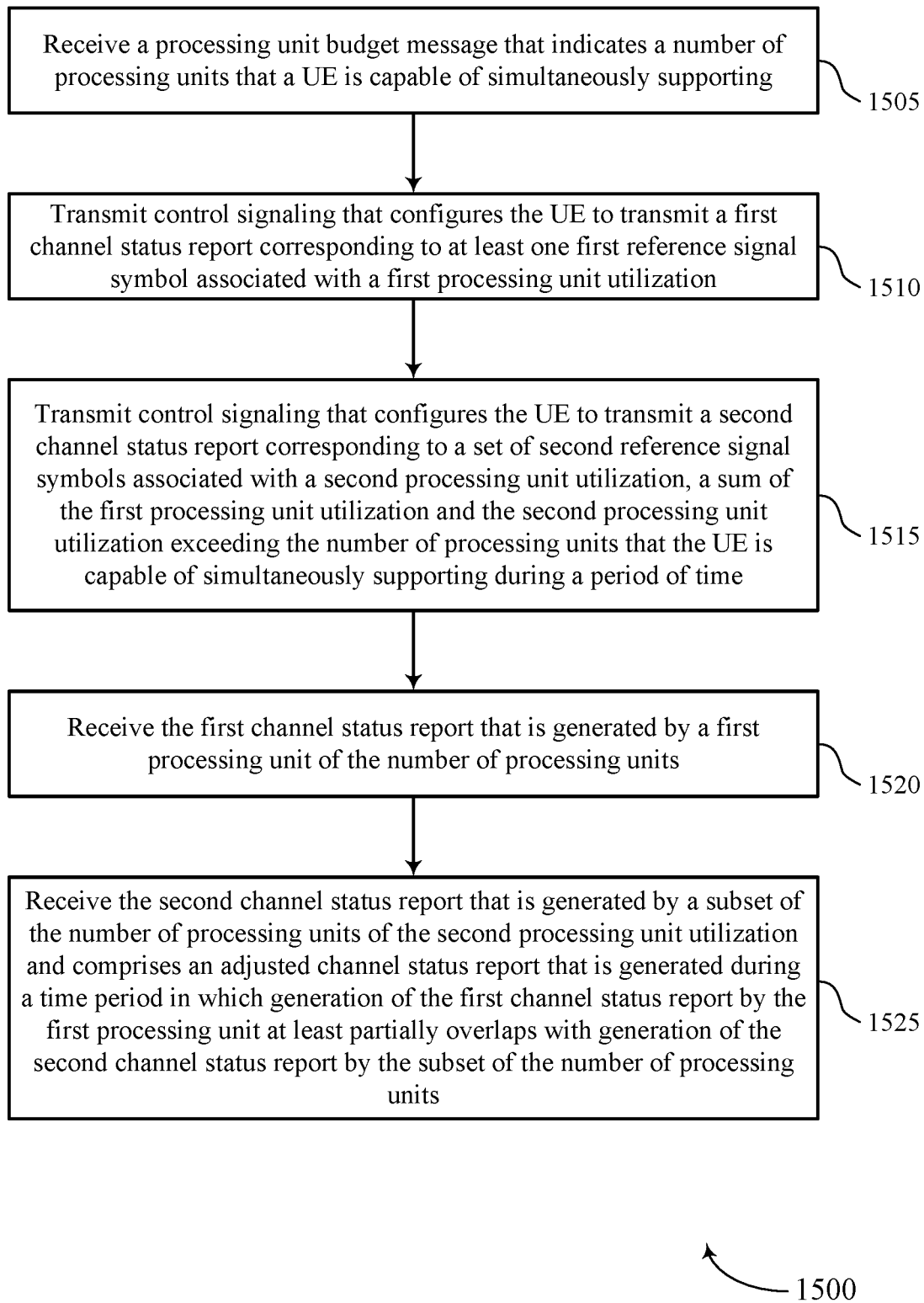

FIG. 15 shows a flowchart illustrating a method 1500 that supports an extrapolated CSI report based on a multi-symbol reference signal in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may receive a processing unit budget message that indicates a number of processing units that a UE is capable of simultaneously supporting. The operations of 1505 may be performed according to the methods described herein. In some examples, aspects of the operations of 1505 may be performed by a budget message component as described with reference to FIGS. 9 through 12.

At 1510, the base station may transmit control signaling that configures the UE to transmit a first channel status report corresponding to at least one first reference signal symbol associated with a first processing unit utilization. The operations of 1510 may be performed according to the methods described herein. In some examples, aspects of the operations of 1510 may be performed by a first control signal component as described with reference to FIGS. 9 through 12.

At 1515, the base station may transmit control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time. The operations of 1515 may be performed according to the methods described herein. In some examples, aspects of the operations of 1515 may be performed by a second control signal component as described with reference to FIGS. 9 through 12.

At 1520, the base station may receive the first channel status report that is generated by a first processing unit of the number of processing units. The operations of 1520 may be performed according to the methods described herein. In some examples, aspects of the operations of 1520 may be performed by a first report component as described with reference to FIGS. 9 through 12.

At 1525, the base station may receive the second channel status report that is generated by a subset of the number of processing units of the second processing unit utilization and includes an adjusted channel status report that is generated during a time period in which generation of the first channel status report by the first processing unit at least partially overlaps with generation of the second channel status report by the subset of the number of processing units. The operations of 1525 may be performed according to the methods described herein. In some examples, aspects of the operations of 1525 may be performed by a second report component as described with reference to FIGS. 9 through 12.

Figure 16:
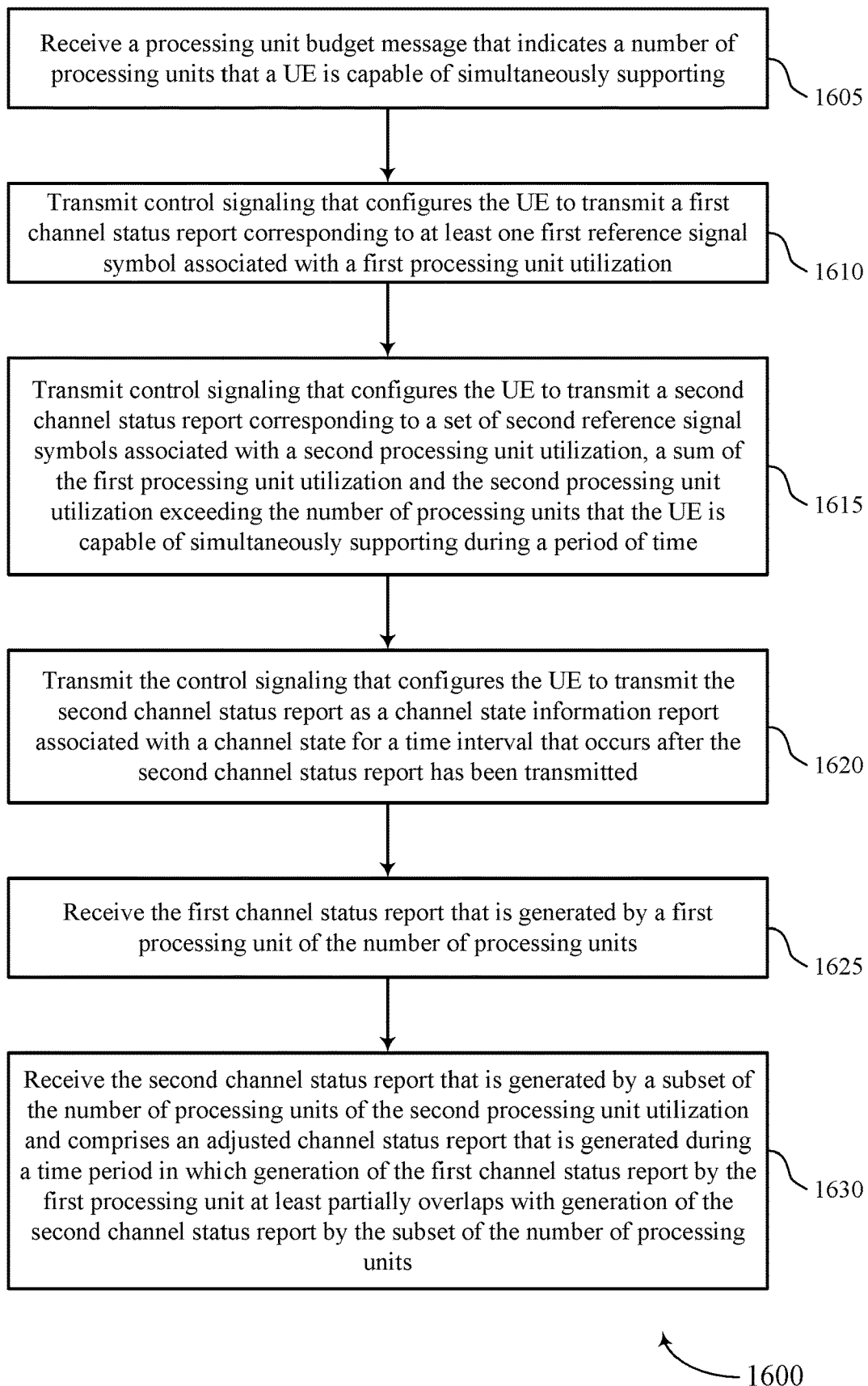

FIG. 16 shows a flowchart illustrating a method 1600 that supports an extrapolated CSI report based on a multi-symbol reference signal in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive a processing unit budget message that indicates a number of processing units that a UE is capable of simultaneously supporting. The operations of 1605 may be performed according to the methods described herein. In some examples, aspects of the operations of 1605 may be performed by a budget message component as described with reference to FIGS. 9 through 12.

At 1610, the base station may transmit control signaling that configures the UE to transmit a first channel status report corresponding to at least one first reference signal symbol associated with a first processing unit utilization. The operations of 1610 may be performed according to the methods described herein. In some examples, aspects of the operations of 1610 may be performed by a first control signal component as described with reference to FIGS. 9 through 12.

At 1615, the base station may transmit control signaling that configures the UE to transmit a second channel status report corresponding to a set of second reference signal symbols associated with a second processing unit utilization, a sum of the first processing unit utilization and the second processing unit utilization exceeding the number of processing units that the UE is capable of simultaneously supporting during a period of time. The operations of 1615 may be performed according to the methods described herein. In some examples, aspects of the operations of 1615 may be performed by a second control signal component as described with reference to FIGS. 9 through 12.

At 1620, the base station may transmit the control signaling that configures the UE to transmit the second channel status report as a CSI report associated with a channel state for a time interval that occurs after the second channel status report has been transmitted. In some cases, the CSI report may be an extrapolation-based CSI report. The operations of 1620 may be performed according to the methods described herein. In some examples, aspects of the operations of 1620 may be performed by a second control signal component as described with reference to FIGS. 9 through 12.

At 1625, the base station may receive the first channel status report that is generated by a first processing unit of the number of processing units. The operations of 1625 may be performed according to the methods described herein. In some examples, aspects of the operations of 1625 may be performed by a first report component as described with reference to FIGS. 9 through 12.

At 1630, the base station may receive the second channel status report that is generated by a subset of the number of processing units of the second processing unit utilization and includes an adjusted channel status report, during a time period in which generation of the first channel status report by the first processing unit at least partially overlaps with generation of the second channel status report by the subset of the number of processing units. The operations of 1630 may be performed according to the methods described herein. In some examples, aspects of the operations of 1630 may be performed by a second report component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a user equipment (UE), comprising:
   transmitting a processing unit budget message that indicates a number of processing units that the UE is capable of simultaneously supporting;
   receiving control signaling that configures the UE to transmit a first channel status report corresponding to one or more first reference signal symbols associated with a first processing unit utilization;
   receiving control signaling that configures the UE to transmit a second channel status report corresponding to a plurality of second reference signal symbols associated with a second processing unit utilization, a sum of the first processing unit utilization and the second processing unit utilization exceeding the number of processing units that the UE is capable of simultaneously supporting during a period of time;
transmitting the first channel status report that is generated by a first processing unit of the number of processing units; and
transmitting the second channel status report that is generated by a subset of the number of processing units of the second processing unit utilization and comprises an adjusted channel status report that is generated based at least in part on processing a subset of the plurality of second reference signal symbols during a time period in which generation of the first channel status report by the first processing unit at least partially overlaps with generation of the second channel status report by the subset of the number of processing units.

2. The method of claim 1, wherein receiving the control signaling that configures the UE to transmit the second channel status report comprises:
receiving the control signaling that configures the UE to transmit the second channel status report as a channel state information report associated with a channel state for a time interval that occurs after transmission of the second channel status report.

3. The method of claim 2, wherein the channel state information report associated with the channel state for the time interval that occurs after the second channel status report has been transmitted comprises non-beam related information comprising a rank indicator, or a precoding matrix indicator, or a channel quality indicator, or any combination thereof.

4. The method of claim 1, wherein receiving the control signaling that configures the UE to transmit the second channel status report comprises:
receiving the control signaling that configures the UE to transmit the second channel status report using at least two of the plurality of second reference signal symbols that are separated by a time duration that satisfies a threshold.

5. The method of claim 1, wherein receiving the control signaling that configures the UE to transmit the first channel status report comprises:
receiving a reporting configuration that indicates a reference resource, wherein the one or more first reference signal symbols are identified in time relative to the reference resource.

6. The method of claim 1, wherein receiving the control signaling that configures the UE to transmit the second channel status report comprises:
receiving a reporting configuration that indicates the plurality of second reference signal symbols.

7. The method of claim 1, wherein receiving the control signaling that configures the UE to transmit the second channel status report comprises:
receiving the control signaling that configures the UE with a parameter configuration for generating the second channel status report.

8. The method of claim 7, further comprising:
adjusting the parameter configuration based at least in part on the sum of the first processing unit utilization and the second processing unit utilization exceeding the number of processing units that the UE is capable of simultaneously supporting during the period of time, wherein the second channel status report is generated based at least in part on the adjusted parameter configuration.

9. The method of claim 1, further comprising:
identifying an overflow condition based at least in part on the sum of the first processing unit utilization and the second processing unit utilization exceeding the number of processing units that the UE is capable of simultaneously supporting during the period of time; and
identifying the subset of the number of processing units, or the subset of the plurality of second reference signal symbols to process, or both, based at least in part on the overflow condition.

10. The method of claim 9, further comprising:
identifying a defined number of processing units to be utilized for generating the second channel status report that is a channel status report indicating a channel state of a time interval that occurs after the second channel status report has been transmitted, wherein the overflow condition is identified based at least in part on the defined number of processing units.

11. The method of claim 9, further comprising:
adjusting a parameter configuration based at least in part on identifying the overflow condition, wherein the second channel status report is generated based at least in part on the adjusted parameter configuration.

12. The method of claim 1, wherein receiving the control signaling that configures the UE to transmit a second channel status report comprises:
receiving the control signaling that indicates a defined number of reference signal resources to use for deriving the second channel status report for a future time interval and a threshold number of the defined number of reference signal resources to utilize when an overflow condition is identified, wherein the second channel status report is generated using at least the threshold number of the reference signal resources.

13. The method of claim 1, further comprising:
generating the second channel status report associated with one or more channel status parameters for a time interval that occurs after the second channel status report has been transmitted.

14. The method of claim 1, further comprising:
generating the second channel status report to satisfy a performance criterion associated with the subset of the number of processing units, or a number of reference signal symbols, or a combination thereof.

15. The method of claim 1, wherein the second channel status report occupies up to all remaining available processing units of the number of processing units that are not utilized for generation of the first channel status report.

16. The method of claim 1, wherein the second channel status report is a channel status information report that indicates a wideband rank indicator, or a narrowband rank indicator, or a wideband precoding matrix indicator, or a narrowband precoding matrix indicator, or a wideband channel quality indicator, or a narrowband channel quality indicator, or any combination thereof.

17. The method of claim 1, wherein the first channel status report is a periodic channel status information report, or a semi-persistent channel status information report, or an aperiodic channel status information report, and the second channel status report is an aperiodic channel status information report.

18. The method of claim 1, wherein the first channel status report is a periodic channel status information report, or a semi-persistent channel status information report, or an aperiodic channel status information report that has a same time behavior as the second channel status report that is a periodic channel status information report, or a semi-persistent channel status information report, or an aperiodic channel status information report.

19. The method of claim 1, wherein the second channel status report does not include a reference signal receive power (RSRP) report, a layer one signal to interference plus noise report (L1-SINR), or a combination thereof.

20. The method of claim 1, further comprising:
transmitting a capability message that indicates that the UE supports reporting an adjusted channel status report associated with a channel state for a time interval that occurs after the second channel status report has been transmitted generated by the subset of the number of processing units that is smaller than a defined number of processing units for the second processing unit utilization.

21. The method of claim 1, further comprising:
identifying an overflow condition based at least part on identifying that a plurality of channel status reports are configured, the plurality of channel status reports including the second channel status report; and
adjusting allocation of the number of processing units for generation of a respective channel status report of the plurality of channel status reports based at least in part on the overflow condition.

22. The method of claim 21, wherein adjusting the allocation comprises:
subtracting a first number of processing units from the allocation for respective channel status reports of a first subset of the plurality of channel status reports, and a second number of processing units from the allocation for a second subset of the plurality of channel status reports.

23. The method of claim 21, wherein adjusting the allocation comprises:
subtracting all allocated processing units to generation of the first channel status report of the plurality of channel status reports, wherein the first channel status report is selected based on an index or a priority rule; and
reporting a stale channel status report as the first channel status report.

24. The method of claim 21, wherein adjusting the allocation comprises:
de-allocating all processing units allocated to generation of the first channel status report of the plurality of channel status reports, wherein the first channel status report is selected based on an index or a priority rule.

25. The method of claim 1, wherein the control signaling comprises downlink control information (DCI), a medium access control (MAC) control element (CE), a radio resource control (RRC) message, or a combination thereof.

26. The method of claim 1, wherein receiving the control signaling that configures the UE to transmit a second channel status report is based at least in part on the processing unit budget message.

27. A method for wireless communications by a base station, comprising:
receiving a processing unit budget message that indicates a number of processing units that a user equipment (UE) is capable of simultaneously supporting;
transmitting control signaling that configures the UE to transmit a first channel status report corresponding to one or more first reference signal symbols associated with a first processing unit utilization;
transmitting control signaling that configures the UE to transmit a second channel status report corresponding to a plurality of second reference signal symbols associated with a second processing unit utilization, a sum of the first processing unit utilization and the second processing unit utilization exceeding the number of processing units that the UE is capable of simultaneously supporting during a period of time;
receiving the first channel status report that is generated by a first processing unit of the number of processing units; and
receiving the second channel status report that is generated by a subset of the number of processing units of the second processing unit utilization and comprises an adjusted channel status report that is generated based at least in part on a subset of the plurality of second reference signal symbols being processed during a time period in which generation of the first channel status report by the first processing unit at least partially overlaps with generation of the second channel status report by the subset of the number of processing units.

28. The method of claim 27, wherein transmitting the control signaling that configures the UE to transmit the second channel status report comprises:
transmitting the control signaling that configures the UE with a parameter configuration for generating the second channel status report.

29. An apparatus for wireless communications by a user equipment (UE), comprising:
a processor,
memory coupled with the processor; and
instructions stored in the memory and executable by the processor to cause the apparatus to:
transmit a processing unit budget message that indicates a number of processing units that the UE is capable of simultaneously supporting;
receive control signaling that configures the UE to transmit a first channel status report corresponding to one or more first reference signal symbols associated with a first processing unit utilization;
receive control signaling that configures the UE to transmit a second channel status report corresponding to a plurality of second reference signal symbols associated with a second processing unit utilization, a sum of the first processing unit utilization and the second processing unit utilization exceeding the number of processing units that the UE is capable of simultaneously supporting during a period of time;
transmit the first channel status report that is generated by a first processing unit of the number of processing units; and
transmit the second channel status report that is generated by a subset of the number of processing units of the second processing unit utilization and comprises an adjusted channel status report that is generated based at least in part on processing a subset of the plurality of second reference signal symbols during a time period in which generation of the first channel status report by the first processing unit at least partially overlaps with generation of the second channel status report by the subset of the number of processing units.

30. An apparatus for wireless communications by a base station, comprising:
a processor,
memory coupled with the processor; and
instructions stored in the memory and executable by the processor to cause the apparatus to:
receive a processing unit budget message that indicates a number of processing units that a user equipment (UE) is capable of simultaneously supporting;
transmit control signaling that configures the UE to transmit a first channel status report corresponding to one or more first reference signal symbols associated with a first processing unit utilization;
transmit control signaling that configures the UE to transmit a second channel status report corresponding to a plurality of second reference signal symbols associated with a second processing unit utilization, a sum of the first processing unit utilization and the second processing unit utilization exceeding the number of processing units that the UE is capable of simultaneously supporting during a period of time;
receive the first channel status report that is generated by a first processing unit of the number of processing units; and
receive the second channel status report that is generated by a subset of the number of processing units of the second processing unit utilization and comprises an adjusted channel status report that is generated based at least in part on a subset of the plurality of second reference signal symbols being processed during a time period in which generation of the first channel status report by the first processing unit at least partially overlaps with generation of the second channel status report by the subset of the number of processing units.

* * * * *